United States Patent [19]

Maegawa et al.

[11] Patent Number: 5,428,545
[45] Date of Patent: Jun. 27, 1995

[54] VEHICLE GUIDING SYSTEM RESPONSIVE TO ESTIMATED CONGESTION

[75] Inventors: Shouiti Maegawa; Chisato Yoshida; Shuichi Nishikawa; Takashi Kakitani, all of Hyogo, Japan

[73] Assignee: Mitsubishi Denki Kabushiki Kaisha, Tokyo, Japan

[21] Appl. No.: 177,597

[22] Filed: Jan. 5, 1994

[30] Foreign Application Priority Data

Jan. 11, 1993 [JP] Japan .................. 5-017849

[51] Int. Cl.⁶ .......................................... G06F 165/00
[52] U.S. Cl. ...................................... 364/444; 364/438
[58] Field of Search ............... 364/444, 449, 450, 436, 364/437, 438; 340/995; 342/357, 457

[56] References Cited

U.S. PATENT DOCUMENTS

| | | | |
|---|---|---|---|
| 5,065,328 | 11/1991 | Abo et al. | 364/426.04 |
| 5,177,685 | 1/1993 | Davis et al. | 364/443 |
| 5,206,641 | 4/1993 | Grant et al. | 340/905 |
| 5,212,643 | 5/1993 | Yoshida | 364/449 |
| 5,243,528 | 9/1993 | Lefebvre | 364/449 |
| 5,272,638 | 12/1993 | Martin et al. | 364/444 |
| 5,289,183 | 2/1994 | Hassett et al. | 340/905 |
| 5,293,163 | 3/1994 | Kakihara et al. | 340/995 |
| 5,313,200 | 5/1994 | Sone | 340/905 |
| 5,363,306 | 11/1994 | Kuwahara et al. | 364/449 |

FOREIGN PATENT DOCUMENTS

| | | |
|---|---|---|
| 62-60100 | 3/1987 | Japan . |
| 2170300 | 7/1990 | Japan . |
| 518773 | 1/1993 | Japan . |

*Primary Examiner*—Michael Zanelli

[57] ABSTRACT

The present invention provides a vehicle guidance system capable of showing a recommendable route between the present position of the vehicle and a destination on a map. The vehicle guidance system comprises a routing unit for finding a recommendable route between the present position of the vehicle and a destination by using road data, a congestion detecting unit detects traffic congestion on the basis of the traveling mode of the vehicle, and a congested place estimating unit estimates presumably congested roads on the recommendable route by using the road data when the congestion detecting unit detects traffic congestion.

15 Claims, 30 Drawing Sheets

FIG. 11

| TYPE OF JUNCTION | CONGESTION ESTIMATION FACTOR |
|---|---|
| JUNCTION JOINED TO [1] | 5.0 |
| JUNCTION JOINED TO [2] AND NOT JOINED TO [1] | 4.0 |
| JUNCTION JOINED TO [3] AND TO NEITHER OF [1] AND [2] | 3.0 |
| JUNCTION JOINED TO [4] AND TO NEITHER OF [1], [2] AND [3] | 2.0 |
| JUNCTION JOINED TO [5] AND TO NEITHER OF [1], [2], [3] AND [4] | 1.0 |

[1] EXPRESS WAY

[2] NATIONAL HIGHWAY

[3] PREFECTURAL ROAD

[4] PRINCIPAL LOCAL ROAD

[5] LOCAL ROAD

FIG. 15

| TYPE OF JUNCTION | CONGESTION ESTIMATION FACTOR |
|---|---|
| JUNCTION JOINED TO FOUR OR LESS ROADS | 0.0 |
| JUNCTION JOINED TO FIVE OR MORE ROADS | 1.0 |

FIG. 16

| | JUNCTION JOINED TO FOUR OR LESS ROADS | JUNCTION JOINED TO FIVE OR MORE ROADS |
|---|---|---|
| JUNCTION JOINED TO [1] | 5.0 | 6.0 |
| JUNCTION JOINED TO [2] AND NOT JOINED TO [1] | 4.0 | 5.0 |
| JUNCTION JOINED TO [3] AND TO NEITHER OF [1] AND [2] | 3.0 | 4.0 |
| JUNCTION JOINED TO [4] AND TO NEITHER OF [1], [2] AND [3] | 2.0 | 3.0 |
| JUNCTION JOINED TO [5] AND TO NEITHER OF [1], [2], [3] AND [4] | 1.0 | 2.0 |

FIG. 17

| TYPE OF JUNCTION | CONGESTION ESTIMATION FACTOR |
|---|---|
| JUNCTION JOINED TO ④ | 5.0 |
| JUNCTION JOINED TO ③ AND NOT JOINED TO ④ | 4.0 |
| JUNCTION JOINED TO ② AND TO NEITHER OF ③ AND ④ | 3.0 |
| JUNCTION JOINED TO ① AND TO NEITHER OF ② , ③ AND ④ | 2.0 |

① : ROAD 13.0m OR ABOVE IN WIDTH

② : ROAD 5.5m OR ABOVE AND LESS THAN 13.0m IN WIDTH

③ : ROAD 3.0m OR ABOVE AND LESS THAN 5.5m IN WIDTH

④ : ROAD LESS THAN 3.0m IN WIDTH

FIG. 18

| CAUSES OF CONGESTION | CONGESTION ESTIMATION FACTOR |
|---|---|
| ROAD WITH A TUNNEL | 0.3 |
| ROAD WITH A BRIDGE | 0.3 |

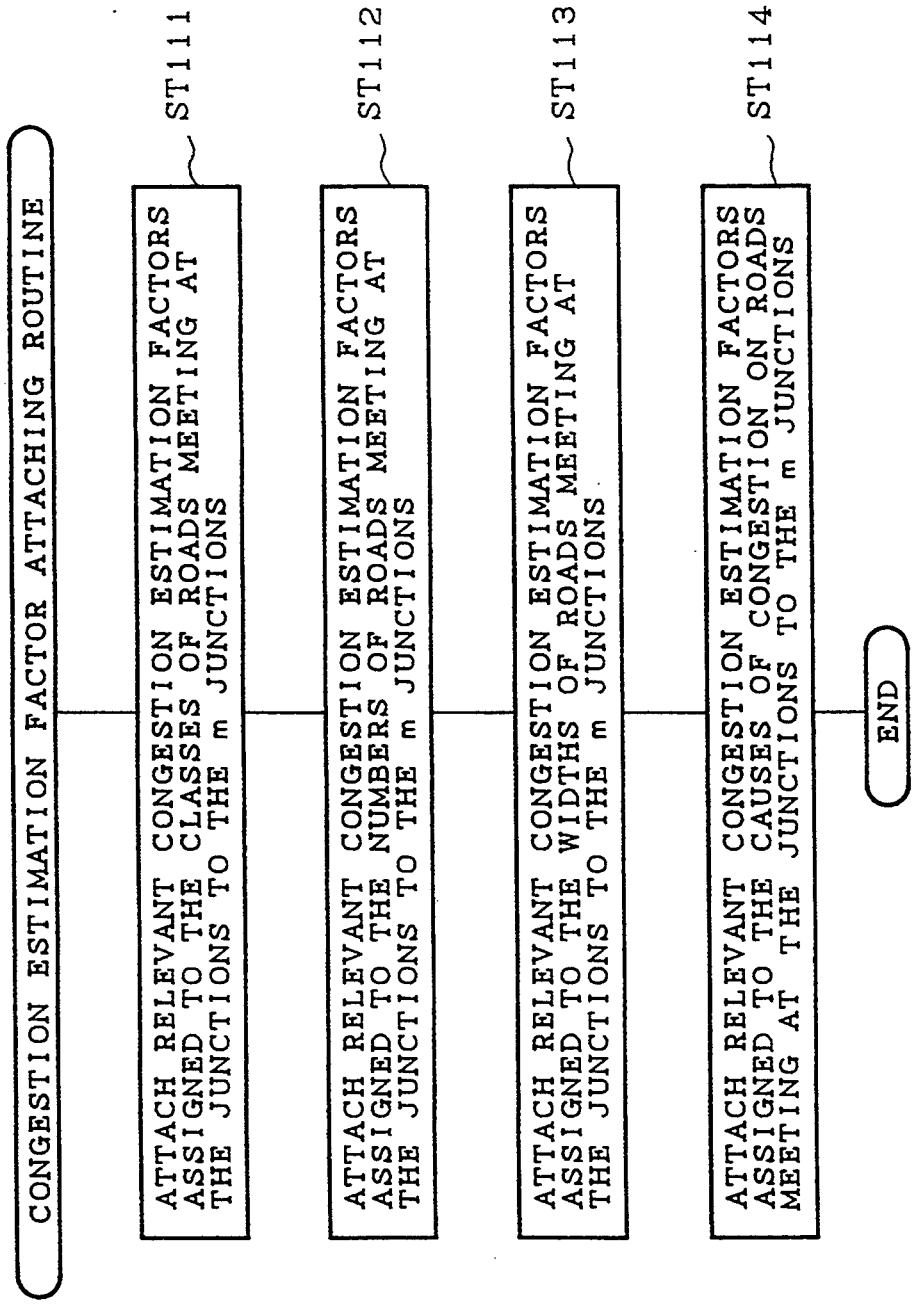

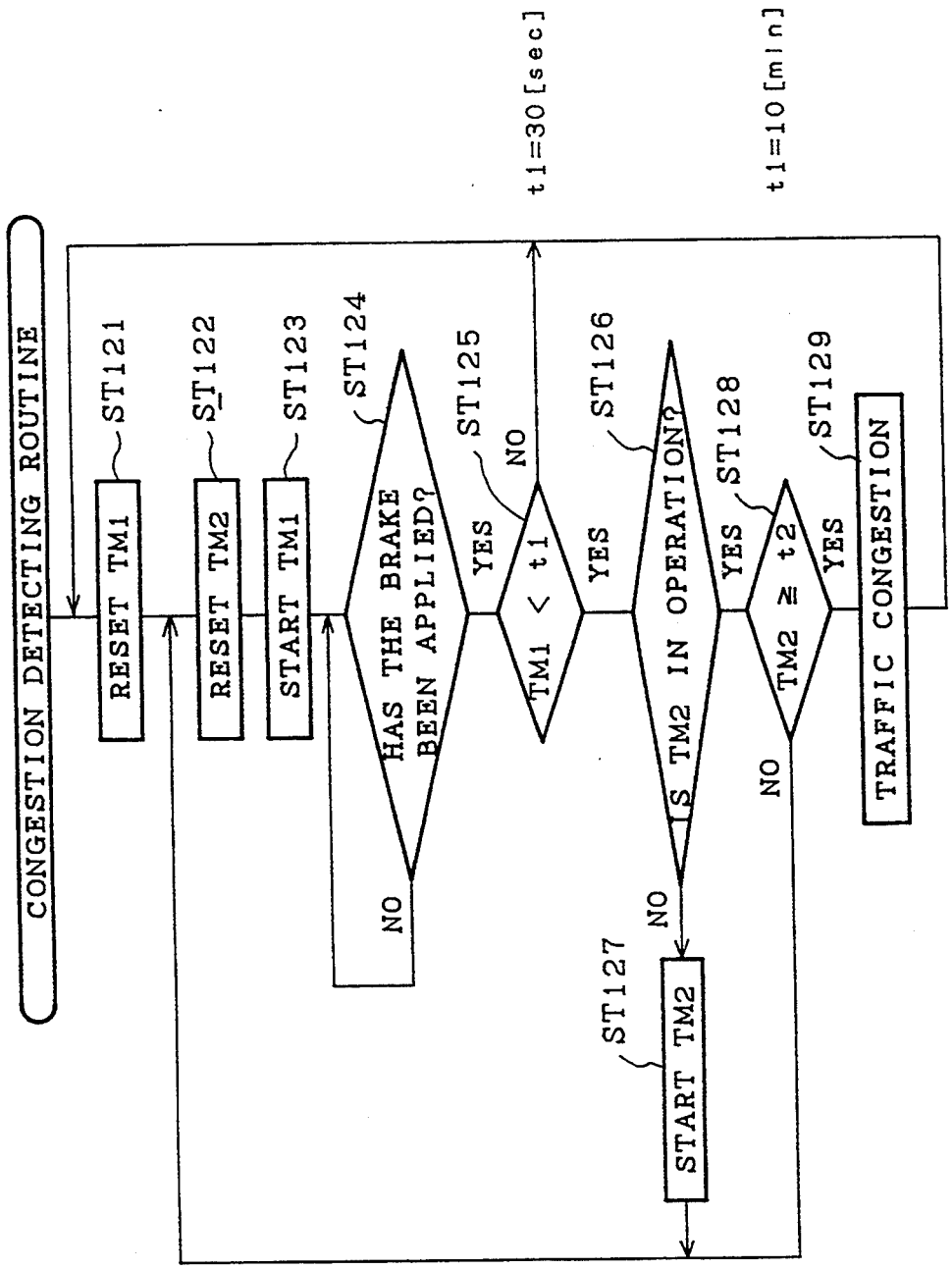

FIG. 28

| JUNCTION NUMBER | CONGESTED TIME INFORMATION |
|---|---|
| 101 | |
| 102 | |
| 103 | 6:30 ~ 8:30 |
| 104 | 7:00 ~ 9:00<br>17:00 ~ 18:30 |
| 105 | |
| 106 | |
| 107 | |
| 108 | |
| 109 | 7:00 ~ 9:00<br>17:00 ~ 18:30 |
| 110 | |
| 111 | |
| 112 | 13:00 ~ 15:00 |
| 113 | 6:00 ~ 8:00<br>17:00 ~ 18:30 |
| 114 | 7:00 ~ 9:00<br>17:00 ~ 18:30 |
| 115 | 13:00 ~ 15:00 |
| 116 | 13:00 ~ 15:00 |

FIG. 29

| ROAD INFORMATION | CONGESTED PERIOD ||||| MEAN TRAVELING SPEED UNDER TRAFFIC CONGESTION (Km/hr) |
| | MONTH | DATE | DAY OF THE WEEK | TIME PERIOD ||
| 101→102<br>101↓102 | | | | | |
| 102→103<br>102↓103 | 1~12 | 1~31 | MON.~FRI. | 6:30~8:30 | 10 |
| 103→104<br>103↓104 | 1~12 | 1~31 | MON.~FRI. | 7:00~9:00 | 10 |
| 104→105<br>104↓105 | 7~8<br>7~8 | 1~31<br>1~31 | SAT.,SUN.<br>SAT.,SUN. | 9:00~18:00<br>9:00~18:00 | 17<br>17 |
| 105→106<br>105↓106 | 7~8<br>7~8 | 1~31<br>1~31 | SAT.,SUN.<br>SAT.,SUN. | 9:00~18:00<br>9:00~18:00 | 17<br>17 |
| 106→107<br>106↓107 | 7~8<br>7~8 | 1~31<br>1~31 | SAT.,SUN.<br>SAT.,SUN. | 9:00~18:00<br>9:00~18:00 | 17<br>17 |
| 113→104<br>113↓104 | 1~12<br>1~12 | 1~31<br>1~31 | MON.~FRI.<br>MON.~FRI. | 6:00~8:00<br>17:00~18:30 | 8<br>15 |
| 104→109<br>104↓109 | 1~12<br>1~12 | 1~31<br>1~31 | MON.~FRI.<br>MON.~FRI. | 7:00~9:00<br>17:00~18:30 | 8<br>15 |
| 109→114<br>109↓114 | 1~12<br>1~12 | 1~31<br>1~31 | MON.~FRI.<br>MON.~FRI. | 7:00~9:00<br>17:00~18:30 | 8<br>15 |
| | | | | | |

FIG. 32

| JUNCTION NUMBER | CONGESTED TIME INFORMATION |
|---|---|
| 101 | |
| 102 | |
| 103 | 6:30 ~ 9:00 |
| 104 | 7:00 ~ 9:00<br>17:00 ~ 18:30 |
| 105 | |
| 106 | |
| 107 | |
| 108 | |
| 109 | 7:00 ~ 9:00<br>17:00 ~ 18:30 |
| 110 | |
| 111 | |
| 112 | 13:00 ~ 15:00 |
| 113 | 6:00 ~ 8:00<br>17:00 ~ 18:30 |
| 114 | 7:00 ~ 9:00<br>17:00 ~ 18:30 |
| 115 | 13:00 ~ 15:00 |
| 116 | 13:00 ~ 15:00 |

VEHICLE GUIDING SYSTEM RESPONSIVE TO ESTIMATED CONGESTION

BACKGROUND OF THE INVENTION

1. Field of the Invention

The present invention relates to a vehicle guidance system capable of showing a recommendable route between the present position of the vehicle and a destination on a map.

2. Description of the Prior Art

FIG. 1 is a block diagram showing the configuration of a vehicle guidance system disclosed in Japanese Patent Laid-open (Kokai) No. 2-28800. Referring to FIG. 1, the vehicle guidance system comprises a data processing unit which executes control programs for guiding a vehicle, a traffic information receiving unit 2 for receiving traffic information transmitted by a traffic information center through transmitters installed on road signboards, the posts of traffic signals and the like, a compact disk player 3 serving as an external read-only storage device for reading road map data stored on a compact disk, a CRT display (cathode-ray tube display) 4 for displaying pictures represented by signals provided by the data processing unit 1, an operating unit 5 comprising input devices, such as key switches and a light pen, a self-supported position sensor 6. The data processing unit 1 comprises a CPU 11, a ROM 12, a RAM 13 and an I/O interface 14. These components of the data processing unit 1 are interconnected by a bus 15.

In operation for finding an optimum route to the destination, the user specifies the destination with the light pen or the like of the operating unit 5 on a road map represented by road map data read by the compact disk player 3 and displayed on the CRT display 4. Then, the data processing unit 1 decides a recommendable route between the present position and the destination through sequential steps of finding a recommendble route between the present position detected by the self-supported position sensor 6 and the destination, selecting routes meeting predetermined restrictive conditions from among the possible routes, and selecting a recommendable route from among the routes selected in the second step and meeting the predetermined restrictive conditions on the basis of traffic information received by the traffic information receiving unit 2 and predetermined routing conditions. Then, the data processing unit 1 displays the recommendable route on the road map displayed on the CRT display 4.

Inventions relating to such a known vehicle guidance system are disclosed, for example, in Japanese Patent Laid-open (Kokai) Nos. 63-148115, 63-171377, 1-161111 and 2-224200.

The known vehicle guidance system thus constructed is not provided with any means for coping with traffic congestion. If the vehicle is involved in traffic congestion at a place unknown to the passengers and where traffic information is unavailable while traveling by the recommended route, it is impossible to estimate the length of a congested section on the route.

SUMMARY OF THE INVENTION

The present invention has been made to solve the foregoing problems and it is therefore an object of the present invention to provide a vehicle guidance system capable of estimating the length of a congested section on a recommended route when involved in traffic congestion while traveling by the recommended route.

A vehicle guidance system in a first aspect of the present invention comprises a road data storage means storing road data, i.e., information about roads, a present position detecting means for detecting the present position of the vehicle, a destination specifying means for specifying a destination, a routing means for finding a recommendable route between the present position and the destination on the basis of the road data, and a traffic congestion estimating means for estimating congested roads on the recommendable route on the basis of the road data when the vehicle is involved in traffic congestion. This vehicle guidance system is capable of estimating congested roads even if the vehicle is involved in traffic congestion at a place where external traffic information is unavailable.

A vehicle guidance system in a second aspect of the present invention comprises a road data storage means storing road data, i.e., information about roads, a present position detecting means for detecting the present position of the vehicle, a destination specifying means for specifying a destination; a routing means for finding a recommendable route between the present position and the destination on the basis of the road data, a traffic condition detecting means for detecting the condition of traffic congestion on the basis of the traveling condition of the vehicle, and a congested road estimating means for estimating congested roads on the recommended road on the basis of the road data when the traffic condition detecting means decides that the vehicle is involved in traffic congestion. This vehicle guidance system is capable of detecting traffic congestion independently when external traffic information is unavailable and of estimating congested roads on the recommended route.

The vehicle guidance system is capable of weighting the road data of presumably congested roads and finding another recommendable route on the basis of the weighted data of the presumably congested roads and of showing the new recommendable route by which the vehicle is able to reach the destination, evading traffic congestion.

BRIEF DESCRIPTION OF THE DRAWINGS

FIG. 11 is a congestion factor table, which shows factors assigned respectively to types of junctions;

FIG. 15 is another congestion factor table;

FIG. 16 is a third congestion factor table;

FIG. 17 is a fourth congestion factor table;

FIG. 18 is a fifth congestion factor table;

FIG. 19 is a flow chart of a road data weighting procedure to be executed by a vehicle guidance system in a fifth embodiment according to the present invention;

FIG. 20 is a flow chart of a congestion detecting procedure to be executed by a vehicle guidance system in a sixth embodiment according to the present invention;

FIG. 28 is a table showing statistically estimated data of traffic congestion by way of example;

FIG. 29 is a table showing statistically estimated data of traffic congestion to be used by a vehicle guidance system in a twelfth embodiment according to the present invention;

FIG. 32 is a table showing statistically estimated data of congestion by way of example.

DETAILED DESCRIPTION OF THE PREFERRED EMBODIMENTS

Preferred embodiments of the present invention will be described hereinafter with reference to the accompanying drawings.

First Embodiment

Figure 1:
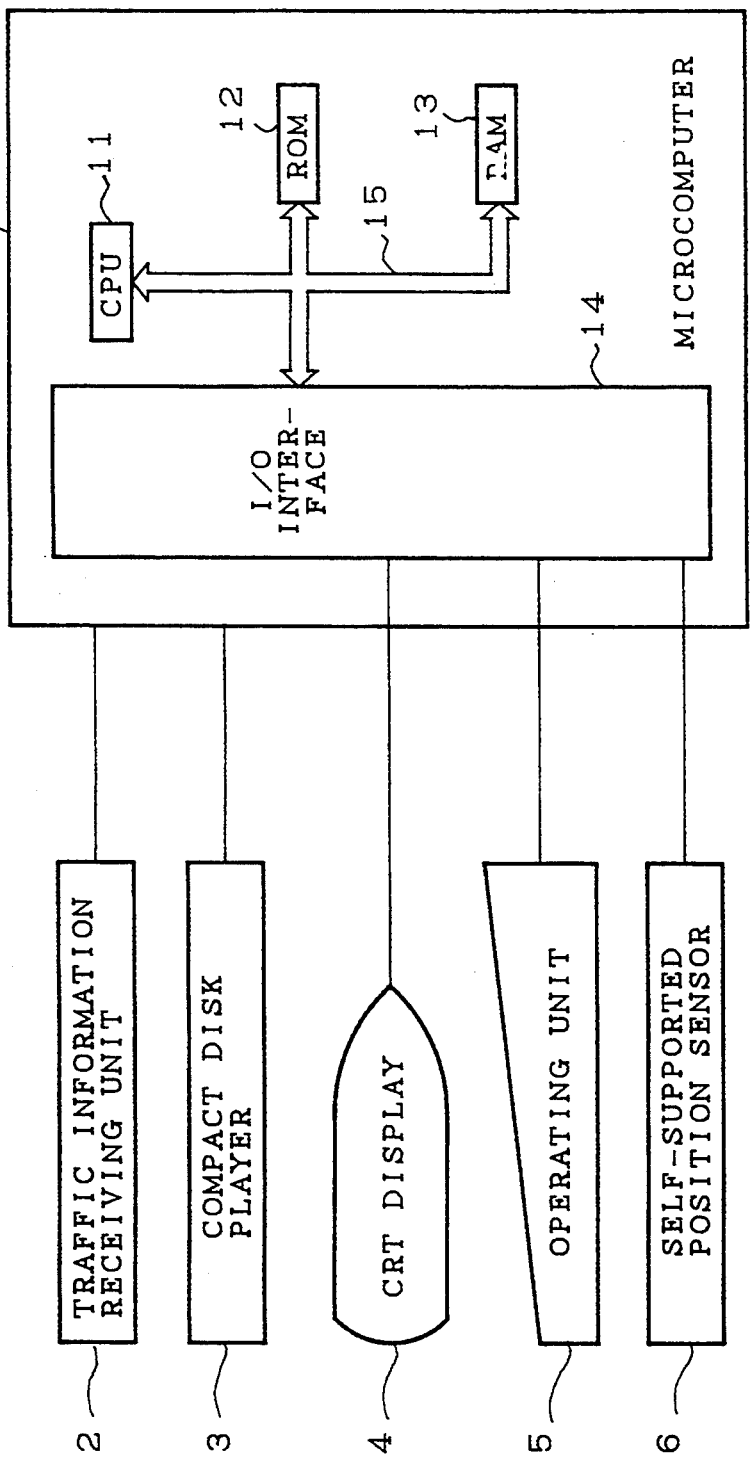
FIG. 1 is a block diagram of a known vehicle guidance system.
Figure 2:
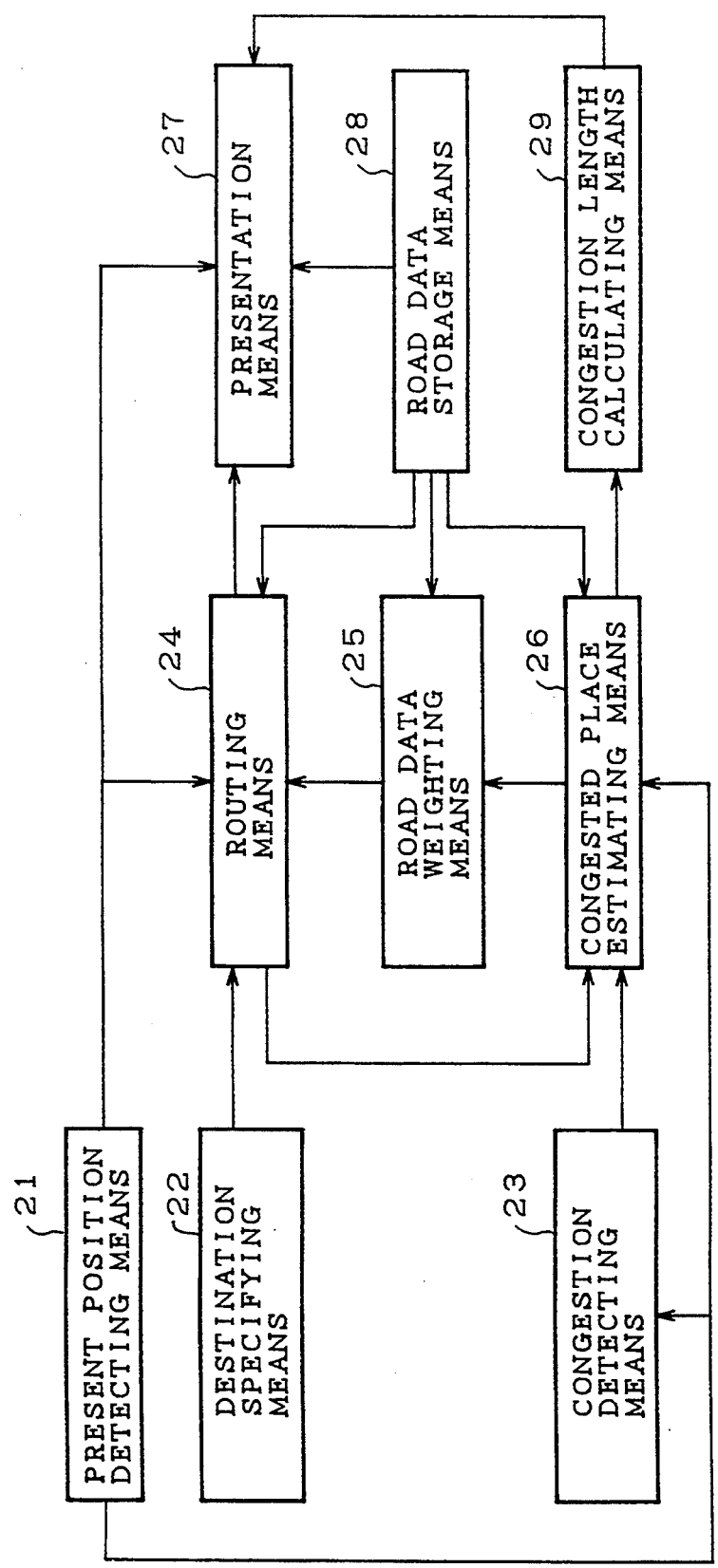
FIG. 2 is a block diagram of assistance in explaining the functional configuration of a vehicle guidance system in accordance with the present invention.

Referring to FIG. 2 showing the functional configuration of a vehicle guidance system in a first embodiment according to the present invention, there are shown a present position detecting means 21 for detecting the present position of the vehicle, a destination specifying means 22 for specifying a destination of the vehicle, a traffic congestion detecting means 23 for detecting traffic condition, a routing means 24 for finding a recommendable route between the present position and the destination, a road data weighting means 25 for weighting the road data of congested roads, a congested place estimating means 26 for estimating congested roads on a recommended route, a presentation means 27 for displaying a recommended route and congested roads, a road data storage means 28 storing road data and information about the road data, and a congestion length calculating means 29 for calculating the length of a congested section.

Figure 3:
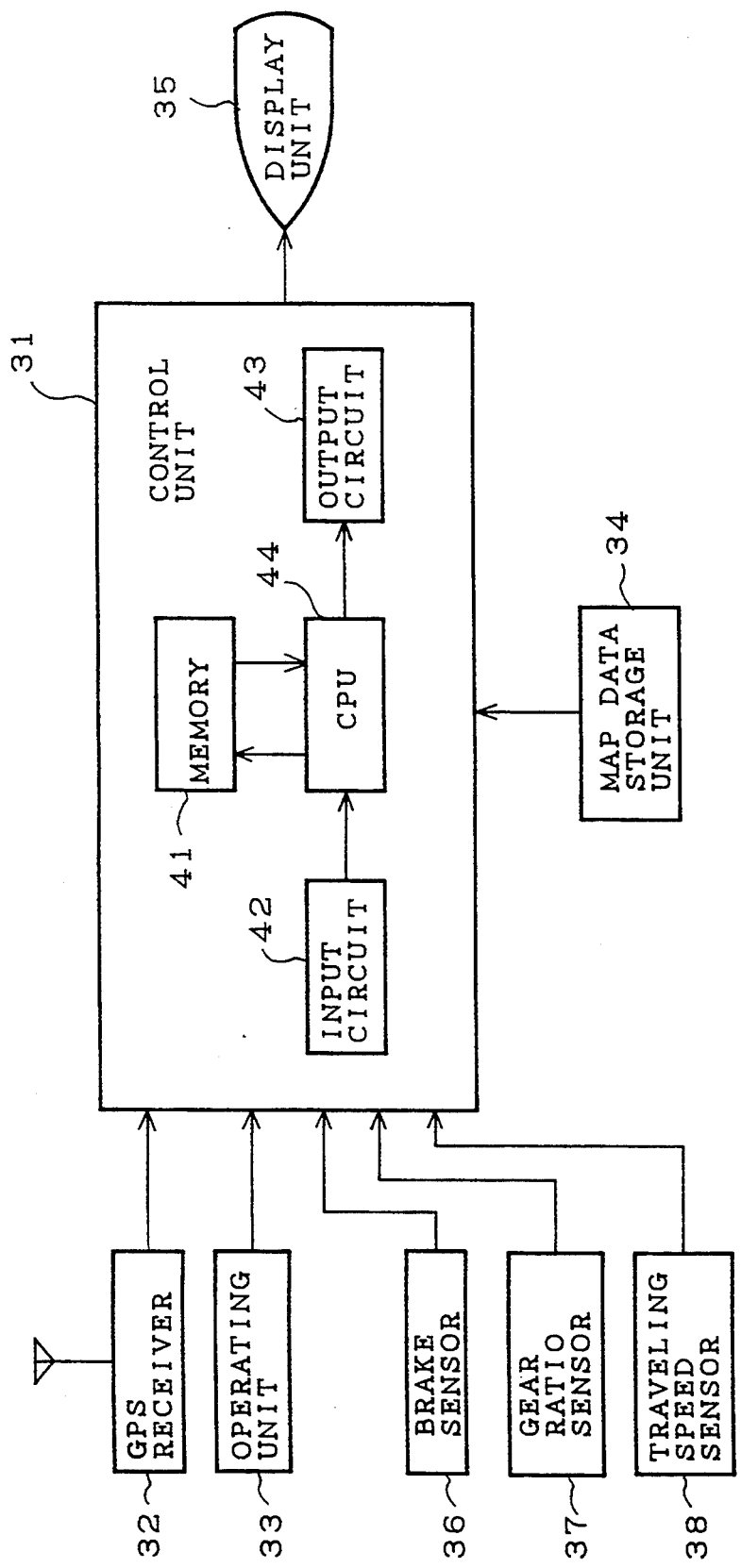
FIG. 3 is a block diagram of a vehicle guidance system in accordance with the present invention.

Referring to FIG. 3, the vehicle guidance system has a control unit 31 which controls the general operation of the vehicle guidance system to realize the traffic congestion detecting means 23, the routing means 24, the road data weighting means 25, the congested place estimating means 26 and the congestion length calculating means 29. The control unit 31 is a microcomputer comprising, for example, a memory unit 41 including a ROM and a RAM, an input circuit 42, an output circuit 43, and a CPU 44 connected to the foregoing components.

A GPS receiver 32 connected to the control unit 31 receives radio waves transmitted by artificial satellites of the global positioning system (GPS) and sends the received information to the control unit 31. An operating unit 33 has input devices, such as key switches, a light pen and infrared touch switches, for entering information to send control signals to the control unit 31. A map data storage unit 34 is, for example, a ROM. Road data and information about the road data are stored in the map data storage unit 34. A display 35, such as a CRT display, displays pictures represented by image signals provided by the control unit 31. A braking mode sensor 36 detects a braking mode while the vehicle is traveling. A gear ratio sensor 37 detects the selected gear of the transmission. A traveling speed sensor 38 detects the traveling speed of the vehicle.

The present position detecting means 21 shown in FIG. 2 may be a position detecting means of any type, provided that the present position detecting means is capable of detecting the present position and direction of the vehicle at fixed intervals, for example, at intervals of 1 sec. The present position detecting means 21 may be, for example, a means that uses signals provided by the GPS receiver 32 of FIG. 3, a means capable of detecting the position of the vehicle on the basis of the output signals of a distance sensor and a direction sensor, and the map data, a means that uses signals provided by a beacon receiver or a means that uses signals provided by a loran C receiver.

The destination specifying means 22 may be a position specifying means of any type, provided that the position specifying means is capable of giving information about a destination specified by the operator to the routing means 24. The destination specifying means 22 may be, for example, a means employing an operating set to be operated by the operator for setting a destination, such as the operating unit 33 of FIG. 3, a means that specifies a destination by the name of a place or a means that specifies a place by the latitude and the longitude.

The traffic congestion detecting means 23 calculates the traveling speed of the vehicle on the basis of the present position varying every moment provided by the present position detecting means 21, and determines whether or not the vehicle is involved in traffic congestion. The routing means 24 uses a junction nearest to the present position as a starting junction, and a junction nearest to the destination specified by the destination specifying means 22 as a goal junction, and searches the map with reference to the road data for an optimum, recommendable route between the starting junction and the goal junction, having the shortest distance to travel or requiring the shortest time to travel.

The road data weighting means 25 weights the road data of congested roads estimated by the congested place estimating means 26. When the traffic congestion detecting means 23 decides that the roads are "Congested", the congested place estimating means 26 estimates a junction causing traffic congestion on the recommended route on the basis of the forms of roads, and gives estimated congestion information about the estimated congested roads to the road data weighting means 25 and the congestion length calculating means 29. The presentation means 27 displays the present position and direction of the vehicle detected by the present position detecting means 21, road data provided by the road data storage means 28, the recommended route recommended by the routing means 24, and congestion information provided by the congestion length calculating means 29. For example, the display means 27 consists of the display unit 35 of FIG. 3 and a display control circuit, and is capable of displaying a road map on an enlarged scale, a road map on a reduced scale, the route on a road map, directory of road maps for use when specifying a destination, a specified destination, the present position of the vehicle on a road map, the direction of the vehicle on a road map and such.

Figure 4:
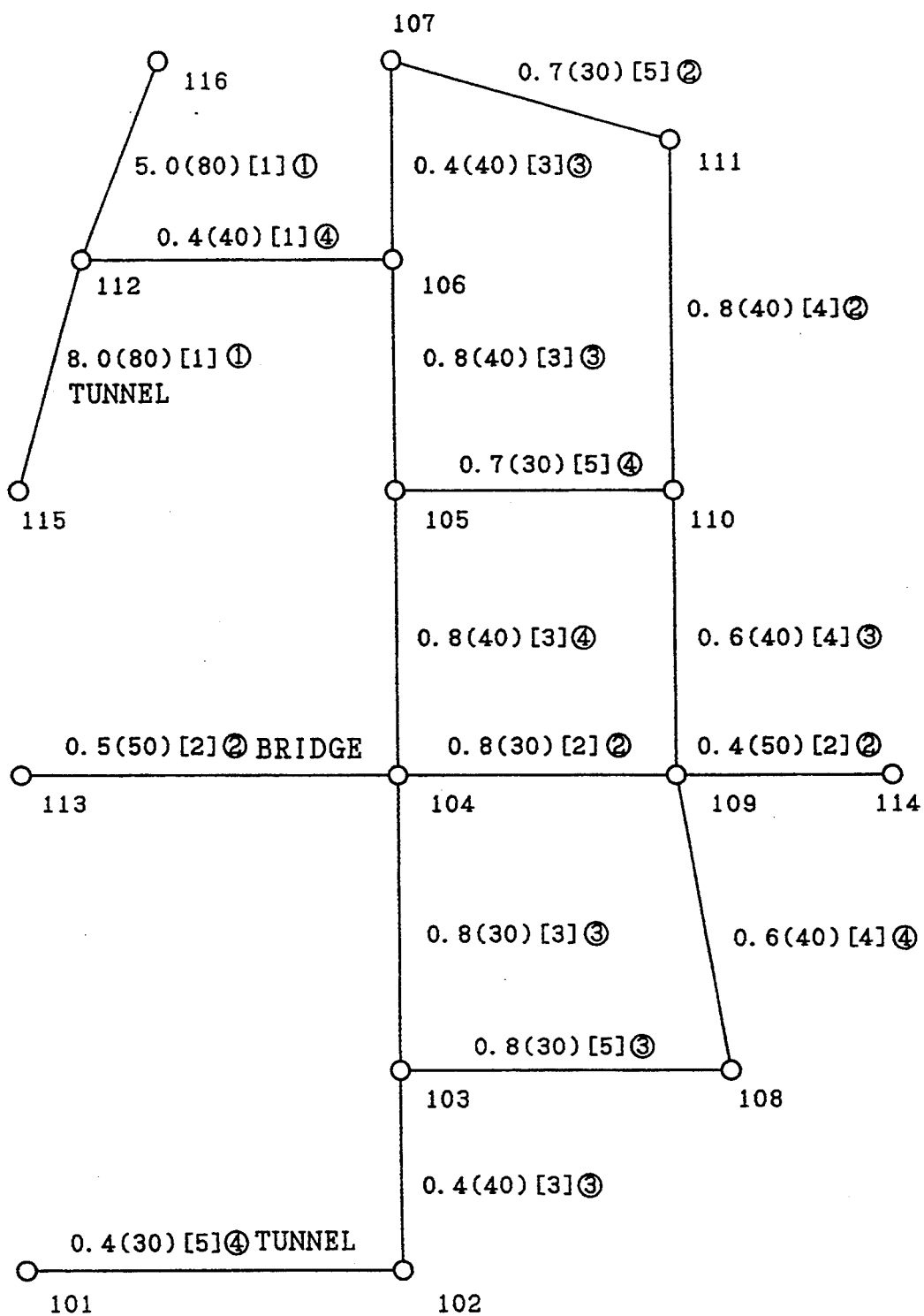
FIG. 4 is a diagrammatic view of an example of road data stored in a road data storage device.

The road data storage means 28, which corresponds to the map data storage unit 34 of FIG. 3, stores road data and information about the road data. Data as shown in FIG. 4 by way of example is stored in the road data storage means 28. In FIG. 4, circles indicate junctions Nos. 101 to 116, straight lines between the circles are roads between the junctions, numerals on the straight lines are distances (km) between the junctions, numerals in parentheses are mean traveling speeds (km/hr) respectively on the roads, numerals in brackets indicate the respective classes of the roads ([1]: Expressway, [2]: National highway, [3]: Prefectural road, [4]: Principal local road, [5]: Local road) and numerals in circles are the respective widths of the roads (①: 13.0 m or above, ②: 5.5 m or above and less than 13.0 m, ③: 3.0 m or above and less than 5.5 m, ④: less than 3.0 m). A remark "Tunnel" indicates that the road has a tunnel or tunnels, and a remark "Bridge" indicates that the road has a bridge or bridges.

The congestion length calculating means 29 calculates the length of the congested section on the basis of the estimated congestion information provided by the congested place estimating means 26 and gives signals representing the estimated congestion information and the calculated length of the congested section to the presentation means 27.

Figure 5:
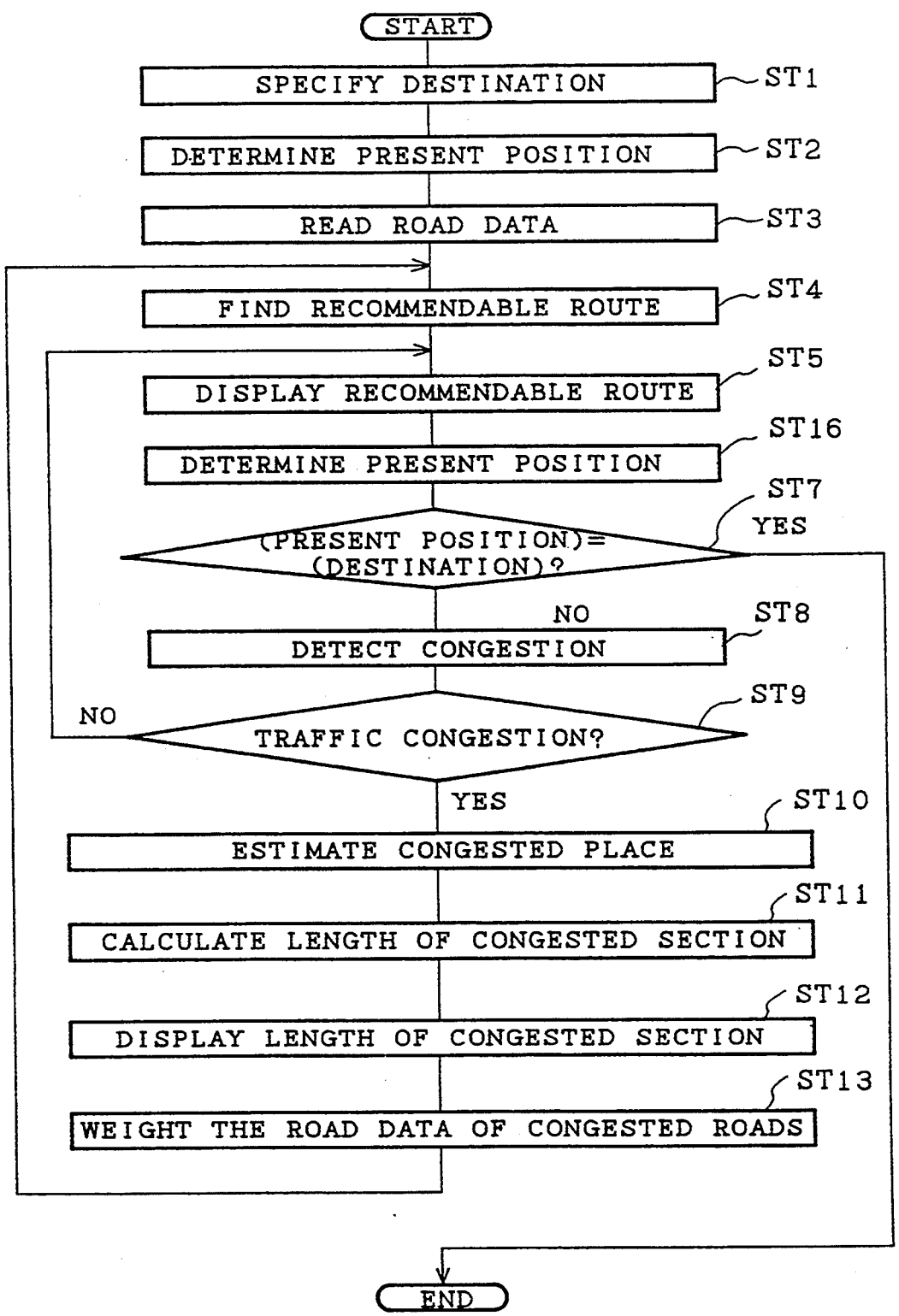
FIG. 5 is flow chart of assistance in explaining the operation of a vehicle guidance system in a first embodiment according to the present invention.

The operation of the vehicle guidance system for finding a recommendable route between the present position and the destination, automatically finding another route to evade traffic congestion when the vehicle is involved in traffic congestion on the recommended route, calculating the length of the congested section and displaying congested roads, the lengths of the congested roads and another route evading the congested roads will be described hereinafter with reference to a flow chart shown in FIG. 5.

Figure 6:
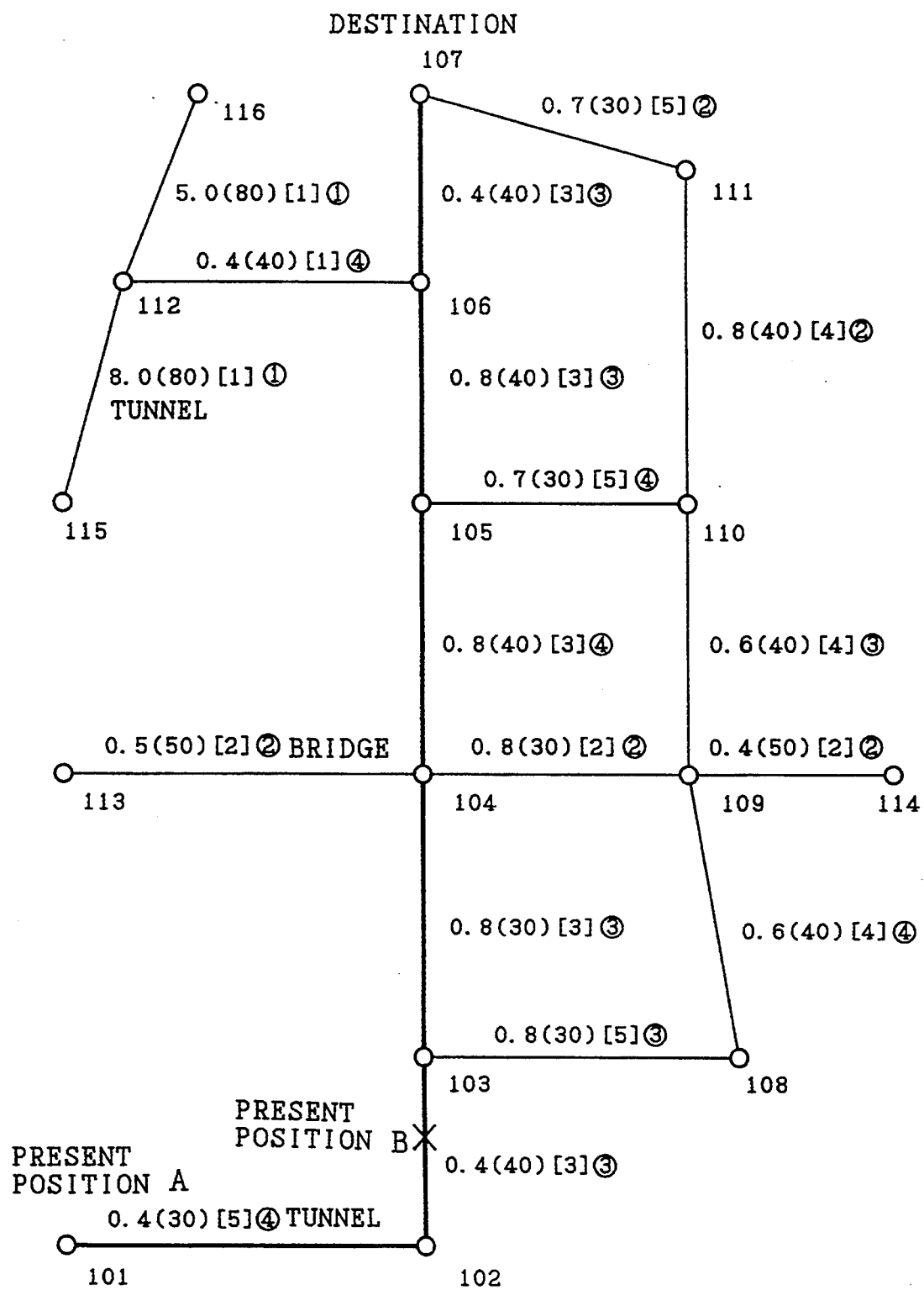
FIG. 6 is a diagrammatic view of assistance in explaining a procedure of finding a recommendable route.

In step ST1, a desired destination is specified by means of the destination specifying means 22. The routing means 24 realized by the control unit 31 receives "Present position", i.e., a signal representing the present position of the vehicle, from the present position detecting means 21 in step ST2 and reads road data from the road data storage means 28 in step ST3. The routing means 24 selects a junction nearest to the present position as a starting junction, and a junction nearest to the destination as a goal junction, and then finds a recommendable route between the starting junction and the goal junction in step ST4. FIG. 6 shows, by way of example, the road data read by the routing means 24 from the road data storage means 28. In FIG. 6, the destination specified in step ST1 is denoted by "Destination" and "Present position" representing the present position of the vehicle received from the present position detecting means 21 in step ST2 is denoted by "Present position A". Accordingly, a junction 107 is the goal junction, and a junction 101 is the starting junction. The routing means 24 selects a route having the shortest distance to travel and requiring the shortest time to travel as a recommendable route. In this case the recommendable route passes junctions 101, 102, 103, 104, 105, 106 and 107 sequentially as indicated by broad lines in FIG. 6.

In step ST5, the recommendable route determined in step ST4 is displayed on the presentation means 27 together with the road data read from the road data storage means 28, the data representing the present position and direction of the vehicle provided by the present position detecting means 21. Then, in step ST6, the control unit 31 receives "Present position" representing the present position of the vehicle varying every moment from the present position detecting means 21 and stops its operation upon the coincidence of the present position of the vehicle with the destination. If the present position of the vehicle is not in coincidence with the destination, the control unit 31 executes a traffic congestion detecting procedure in step ST7. In step ST8, the traffic congestion detecting means 23 decides whether or not the vehicle is involved in traffic congestion on the basis of data representing the traveling condition of the vehicle, such as the traveling speed of the vehicle. If it is decided in step ST9 that the roads are "Congested", a congested place estimating procedure is executed. If it is decided in step ST9 that the traffic is "not congested", the routine returns to step ST5. In step ST10, the congested place estimating means 26 estimates a congested road, and gives estimated congestion information about the estimated congested road to the congestion length calculating means 29 and the road data weighting means 25. The estimated congestion information, which will be described in detail later, is information about the condition of roads between the junction expected to have caused traffic congestion and the junction nearest to the present position.

The congestion length calculating means 29 calculates the length of a congested section in step ST11. The calculated length of the congested section, and the estimated congestion information given to the congestion length calculating means 29 in step ST10 are given to the presentation means 27. Then, the presentation means 27 displays those pieces of information in step ST12. For example, when the estimated congestion information includes the junctions 103, 104, 105 and 106 shown in FIG. 6, the length of the congested section corresponds to the sum of the respective lengths of the roads connecting the junctions 103, 104, 105 and 106, namely, as shown in FIG. 5, 0.8+0.8+0.8=2.4. Thus, the length of the congested section is about 2.4 km.

In step ST13, the road data weighting means 25 weights the road data on the basis of the estimated congestion information provided by the congested place estimating means 26. For example, the length of each congested road is multiplied by 5 or the traveling speed on each congested road is multiplied by 1/5. The congested road is such a road as specified by the estimated congestion information. Then, the routine returns to step ST4. After receiving "Present position" from the present position detecting means 21, the routing means 24 selects a junction nearest to the present position as a starting junction, and a junction nearest to the destination as a goal junction, and executes step ST4 to find a new, recommendable route by using the weighted road data of the congested roads and gives information about the new, recommendable route to the presentation means 27.

Figure 7:
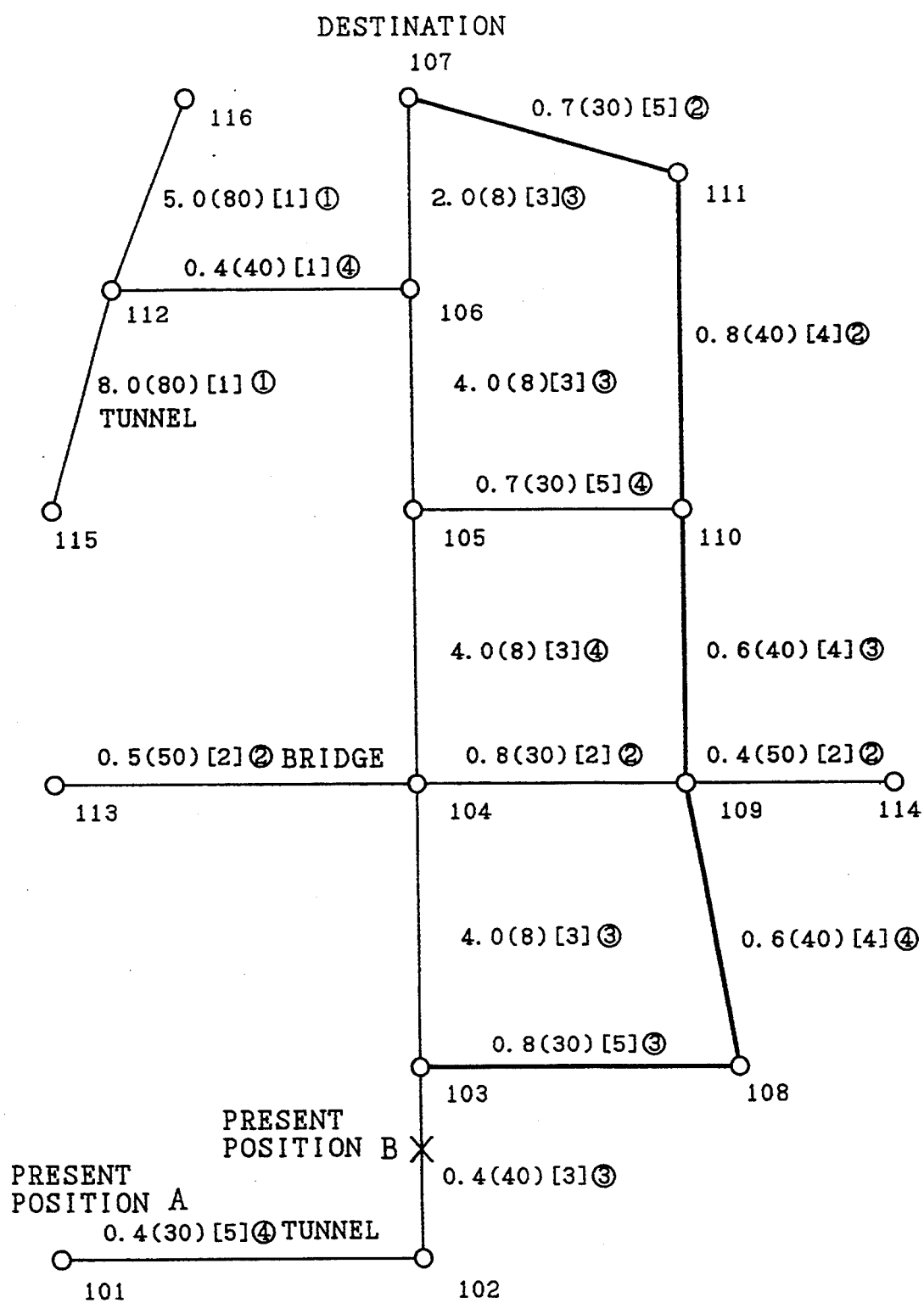
FIG. 7 is a diagrammatic view of assistance in explaining a procedure of finding another recommendable route evading traffic congestion.

In FIG. 7 showing road data of the new, recommendable route including roads represented by weighted road data, the present position B marked with a cross (x) is a position where the traffic congestion detecting means 23 decided that the roads ahead of the position are congested. When the estimated congestion information indicates that the roads passing the junctions 103, 104, 105 and 106 are congested, for example, the length of each of the roads is multiplied by 5 or the traveling speed on the road is multiplied by 1/5 for weighting. Then, the routing means 24 executes a routing operation on the basis of the weighted road data to find a recommendable route from the junction 103 nearest to the present position B to the goal junction 107 nearest to the destination specified in step ST1. In the case shown in FIG. 7, the recommendable route, which has the shortest distance to travel and requires the shortest time to travel, determined by the routing means 24 starts from the junction 103, passes the junctions 108, 109, 110 and 111, and terminates at the junction 107 as indicted by broad lines in FIG. 7.

Figure 8:
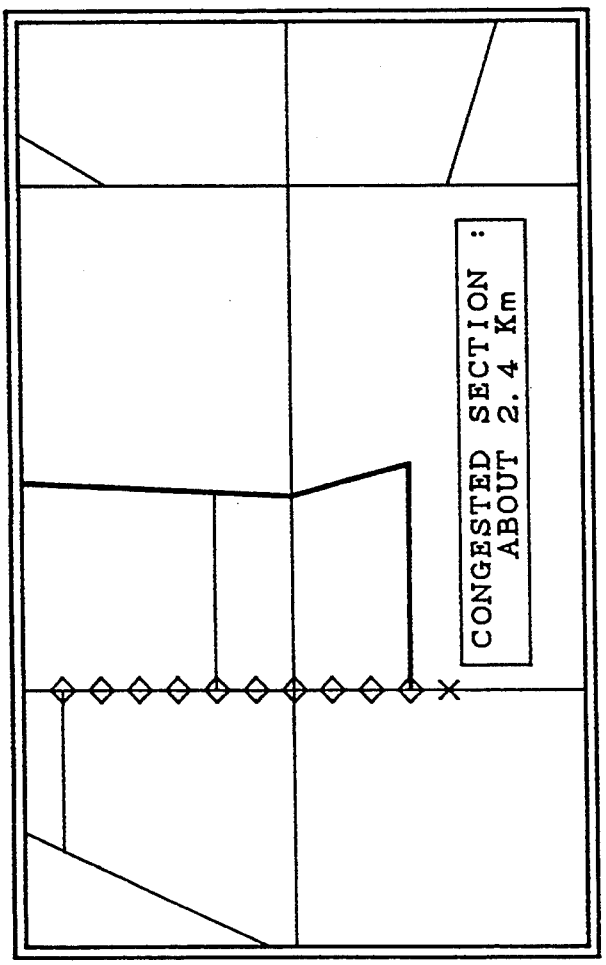
FIG. 8 is a view of an example of a picture showing information about traffic congestion.

The presentation means 27 displays the new, recommendable route in step ST5. FIG. 8 shows a picture of the new, recommendable route by way of example; that is the road data, the present position and direction of the vehicle, the length of the congested section, the estimated congestion information and the recommended route are displayed on the screen of the display unit 35. In FIG. 8, the present position of the vehicle is marked with a cross, the congested roads are marked with diamonds, the length of the congested section is displayed in the lower portion of the screen, and the recommended route evading the congested section is indicated by broad lines.

Figure 9:
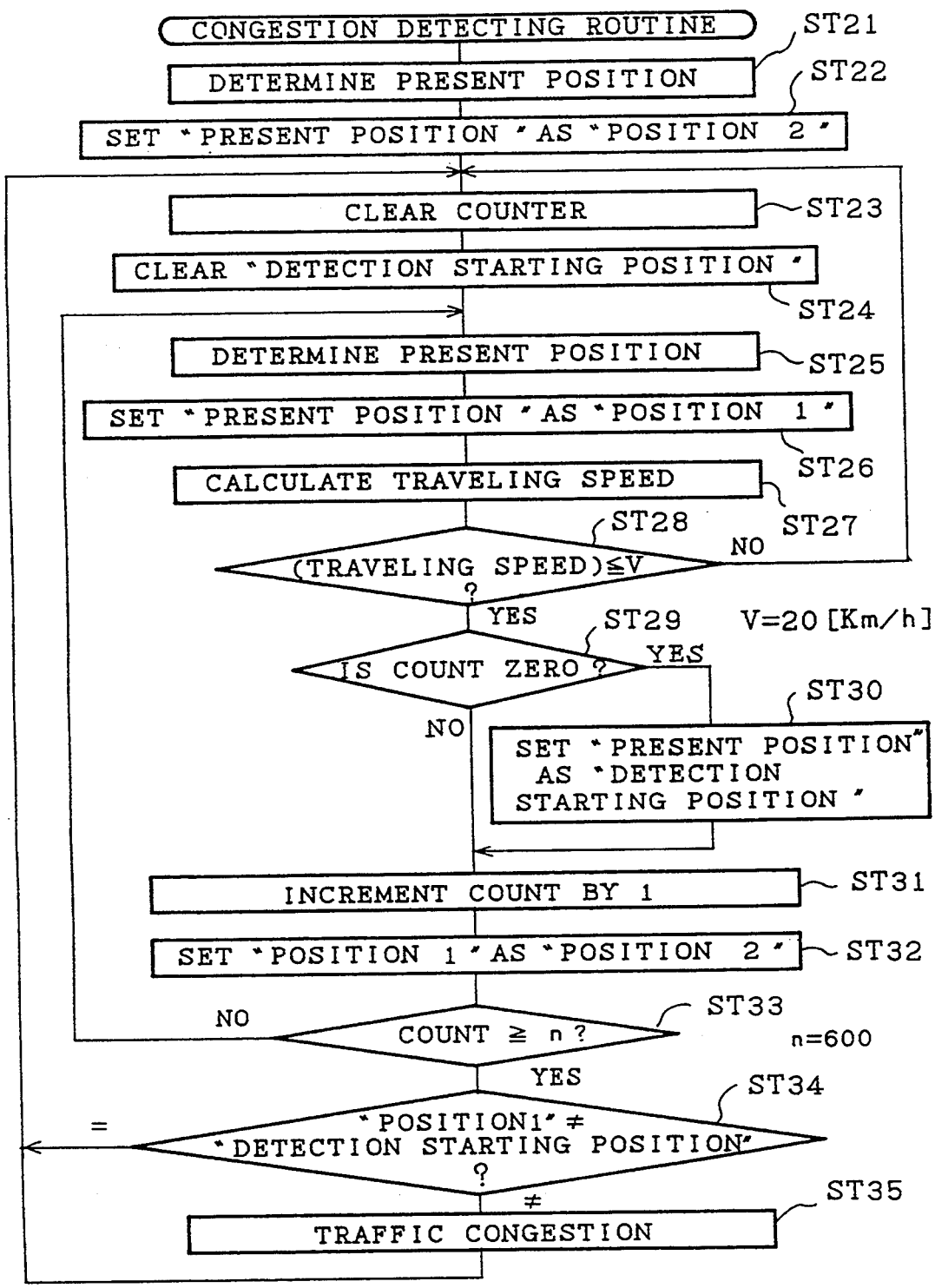
FIG. 9 is a flow chart of a traffic congestion detecting procedure to be executed by the vehicle guidance system in the first embodiment.

A congestion detecting procedure to be executed in step ST8 will be described hereinafter with reference to a flow chart shown in FIG. 9. Referring to FIG. 9, "Place 1", "Place 2" and "Detection starting position" are variables. The present position detected by the present position detecting means 21 is given to the congestion detecting means 23 in step ST21. Then, the congestion detecting means 23 sets "Place 2" as "Present position" in step ST22, clears a counter to "0" in step ST23, and clears "Detection starting position" in step ST24. Then, the congestion detecting means 23 receives "Present position" from the present position detecting means 21 in step ST25 and sets "Place 1" as "Present position" in step ST26. The present position detecting means 21 detects the present invention periodically at intervals of, for example, 1 sec. therefore, the congestion detecting means 23 is able to determine the traveling speed (km/hr) by dividing the distance between the "Place 1" and "Place 2" by, for example, 1/3600 hours in step ST27. For example, when "Place 1" is indicated by coordinates (x1, y1) and "Place 2" is indicated by coordinates (x2, y2), the traveling speed of the vehicle can be calculated by:

$$\text{Traveling speed (km/hr)} = \sqrt{(x1 - x2)^2 + (y1 - y2)^2} / (1/3600) \quad (1)$$

The congestion detecting means 23 compares the calculated traveling speed with a predetermined threshold speed v, for example, 20 km/hr, in step ST28. The routine returns to step ST23 if the calculated traveling speed is higher than the threshold speed v or the congestion deciding procedure is started if the calculated traveling speed is not higher than the threshold speed v.

The congestion detecting means 23 makes a query in step ST29 to see if the count of the counter is zero. If the response in step ST29 is affirmative, the congestion detecting means 23 sets the present position detected at the time when the congestion deciding operation was started as a "detection starting position" in step ST30, increments the count of the counter by one in step ST31, and then the place set as "Place 1" is set as "Place 2" in step ST32. If the count of the counter is less than a predetermined count n, such as 600, the routine returns to step ST25 for the subsequent detection of the reduction of the traveling speed. The count of the counter equal to or greater than the predetermined count n indicates that the reduction of the traveling speed has continued for a time period corresponding to a time period in which the predetermined count n is counted. Accordingly, the congestion detecting means 23 decides in step ST33 that the vehicle is involved in traffic congestion or the vehicle is stopped and goes to step ST34. When the traveling speed increases beyond the threshold speed v before the count of the counter reaches the predetermined count n, the congestion detecting means 23 exits the congestion deciding loop in step ST28 and clears the counter in step ST23.

When it is decided that the vehicle is involved in traffic congestion or stopped, the congestion detecting means 23 compares "Place 1" set as "Present position" with "Detection starting position" in step ST34. If "Place 1" and "Detection starting position" are the same position, it is decided that the vehicle is stopping, and the routine returns to step ST23. If the "Place 1" and the "Detection starting position" are different from each other, the congestion detecting means 23 decides that the roads are "Congested" and gives a signal to the congested place estimating means 26 to that effect in step ST35.

Figure 10:
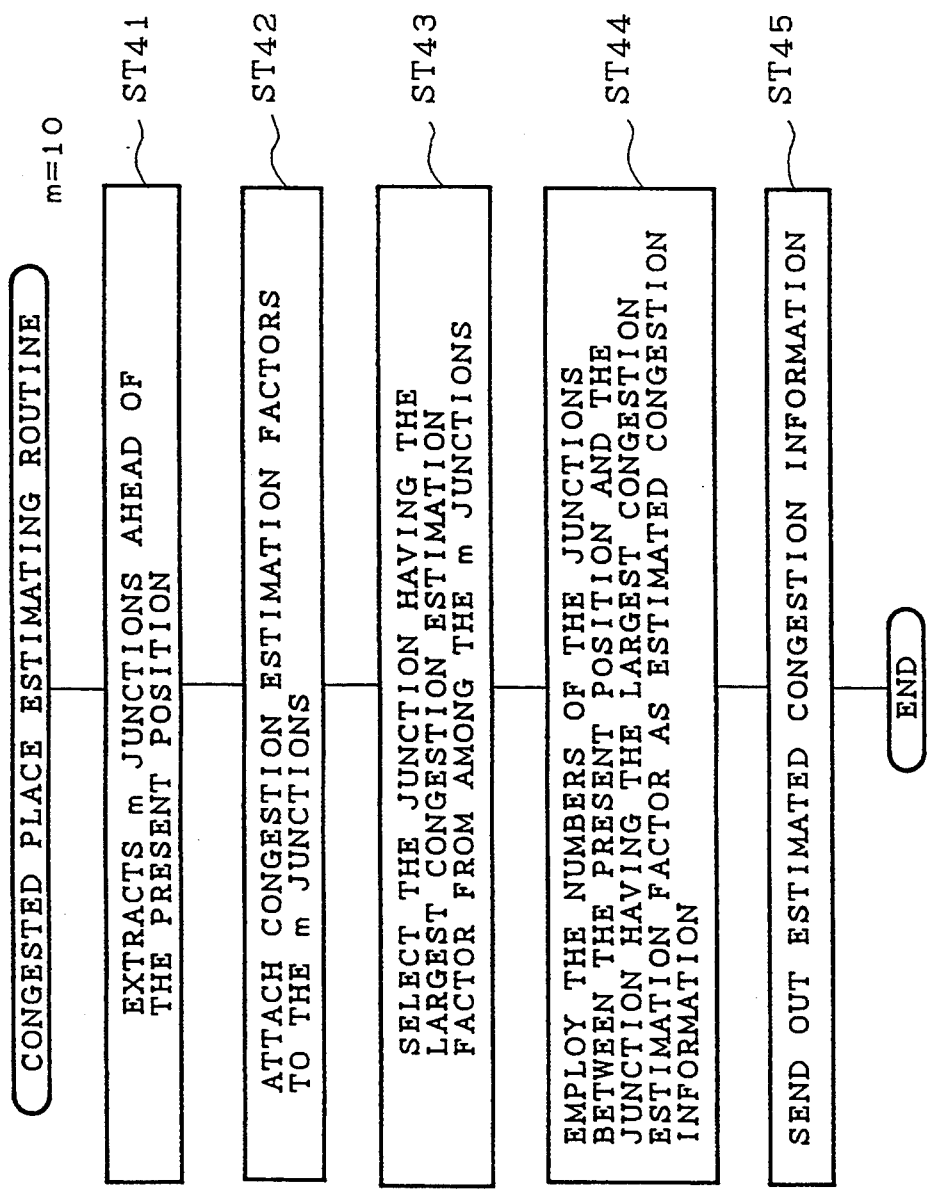
FIG. 10 is a flow chart of a congested place estimating procedure to be executed by the vehicle guidance system in the first embodiment.

A congested place estimating procedure to be executed in step ST10 will be described hereinafter with reference to a flow chart shown in FIG. 10. In step ST41, the congested place estimating means 26 samples a predetermined number m of junctions, for example, ten junctions, ahead of the present position where the congestion detecting means 23 has decided that the roads are "Congested" on the recommended route. If the number of junctions on the recommended route from the present position to the destination is smaller than the predetermined number m, the congested place estimating means 26 samples all the junctions. For example, when the present position detecting means 21 provides "Present position B" marked with a cross in FIG. 6 and the congestion detecting means 23 provides a signal representing "Congested" the junctions 103, 104, 105, 106 and 107 are sampled.

Then, the congested place detecting means 26 finds the respective classes of the roads meeting at each of the junctions sampled in step ST41, making reference to the road data read from the road data storage means 28. Then, in step ST42, the congested place estimating means 26 attaches congestion estimation factors shown in the table of congestion estimation factors (FIG. 11) to the junctions.

The table of congestion estimation factors shows the classes of roads meeting at the junctions and corresponding factors indicating probabilities of occurrence of congestion. In FIG. 11, [1] to [5] indicates the classes of roads; for example, [1] indicates an express way, [2] indicates a national highway, [3] indicates a prefectural road, [4] indicates a principal local road and [5] indicates a local road. The junction where an express way and a national highway meet has many causes of congestion, such as an interchange and heavy traffic, and hence a large congestion estimation factor is assigned to such a junction. Since principal local roads and local roads have only a few causes of congestion, small congestion estimation factors are assigned to those roads. In this case, the congestion estimation factors 3.0, 4.0, 3.0, 5.0 and 3.0 are assigned to the junctions 103, 104, 105, 106 and 107, respectively.

Then, in step ST42, the congested place estimating means 26 selects the junction to which the largest congestion estimation factor was attached from among the sampled junctions. If there are a plurality of junctions to which the largest congestion estimation factor was attached, the junction farthest from the present position of the vehicle is selected in step ST43. In the case shown in FIG. 6, the junction 106 to which a congestion estimation factor 5.0 is attached is selected from among the junctions 103, 104, 105, 106 and 107.

Then, in step ST44, the junctions between the present position of the vehicle and the junction to which the largest congestion estimation factor was attached are sampled to use the junctions as estimated congestion information, and then the estimated congestion information is given to the road data weighting means 25 and the congestion length calculating means 29 in step ST45. In this case shown in FIG. 6, since the junction 106 was selected in step ST43, and the present position of the vehicle is at "Present position B" marked with a cross, a string of the junctions 103, 104, 105 and 106 is the estimated congestion information.

Although a decision as to whether or not the road is congested is made on the basis of the traveling condition of the vehicle, such as the traveling speed of the vehicle, in this embodiment, it is also possible for the operator to decide that the vehicle is involved in traffic congestion and to give a signal to the vehicle guidance system to that effect by operating the operating unit 33. The traveling speed may be detected by the traveling speed sensor 38 provided on the vehicle.

Second Embodiment

The first embodiment decides that the vehicle is involved in traffic congestion when traveling speeds not higher than the threshold speed v is detected n times successively. However, it may be decided that the vehicle is involved in traffic congestion when traveling speeds not higher than the threshold speed v are detected successively in a predetermined decision time t. A vehicle guidance system in a second embodiment according to the present invention employs the latter method for deciding that the vehicle is involved in traffic congestion.

Figure 12:
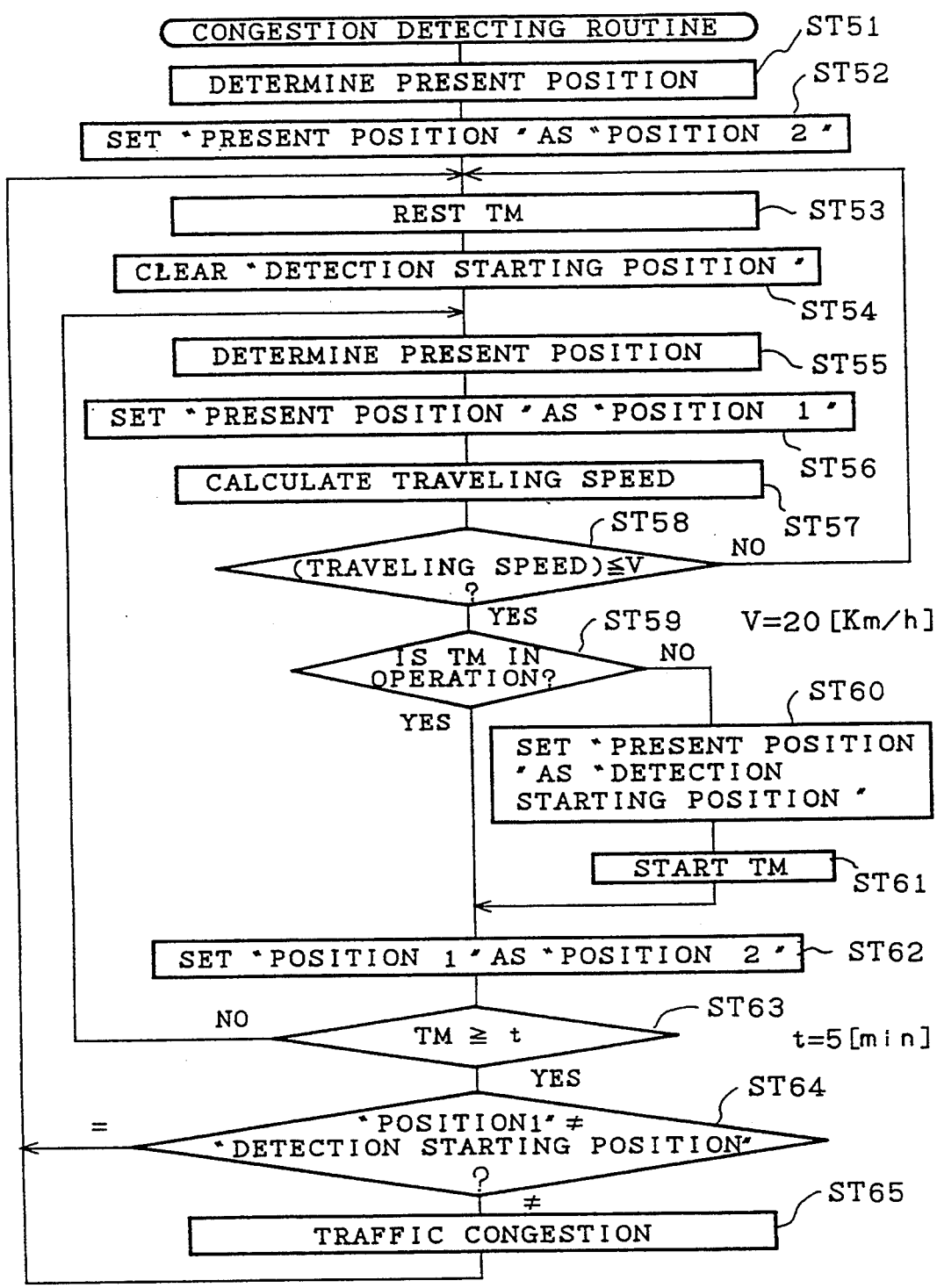
FIG. 12 is a flow chart of a congestion detecting procedure to be executed by a vehicle guidance system in a second embodiment according to the present invention.

The second embodiment will be described hereinafter on a assumption that the threshold speed v=20 km/hr and the decision time t=5 min. The functional configuration of the vehicle guidance system in the second embodiment is the same as that shown in FIG. 2, and the arrangement of the concrete components of the same is the same as that shown in FIG. 3. The general operation of the vehicle guidance system in the second embodiment is the same as that represented by the flow chart shown in FIG. 5, except that the vehicle guidance system in the second embodiment executes a procedure represented by a flow chart in FIG. 12 in step ST8.

In operation, a congestion detecting means 23 receives "Present position" from a present position detecting means 21 in step ST51 and sets "Present position" as "Place 2" in step ST52. A congestion detecting interval timer TM is reset in step ST53 and "Detection starting position" is cleared in step ST54.

The congestion detecting means 23 receives "Present position" again from the present position detecting means 21 in step ST55 and sets "Present position" as "Place 1" in step ST56. Since the present position detecting means 21 detects the present position periodically, for example, at intervals of 1 sec, the congestion detecting means 23 calculates the traveling speed (km/hr) of the vehicle by dividing the distance between "Place 1" and "Place 2" by, for example, 1/3600 hr in step ST57. For example, when "Place 1" is indicated by coordinates (x1, y1) and "Place 2" is indicated by coordinates (x2, y2), the traveling speed of the vehicle can be calculated by using the expression (1).

The congestion detecting means 23 compares the calculated traveling speed with a predetermined threshold speed v, i.e., 20 km/hr in step ST58. If the traveling speed is higher than the threshold speed v, the routine returns to step ST53 and if the traveling speed is not higher than the threshold speed v, a congestion deciding procedure is started.

The congestion detecting means 23 makes a query in step ST59 to see if the congestion detecting interval timer TM is in operation. The routine goes to step ST62 if the response in step ST59 is affirmative or goes to step ST60 if the response in step ST59 is negative. When the congestion detecting interval timer TM is not in operation, the present position of the vehicle given in step ST55 is set as "Detection starting position" in step ST60 and the congestion detecting interval timer TM is started in step ST61.

Then, the congestion detecting means 22 sets the place set as "Place 1" to "Place 2" in step ST62, and then makes a query to see if the time measured by the congestion detecting interval timer TM is equal to or longer than the decision time t (5 min) in step ST63. If the response in step step ST63 is negative, the routine returns to step ST55 to repeat the speed reduction detecting loop. When the duration of the traveling speed lower than the threshold speed v is equal to or longer than the decision time t, the response in step ST63 is affirmative. When the response in step ST63 is affirmative, the congestion detecting means 23 decides that the vehicle is stopped or involved in traffic congestion and executes step ST64. When the traveling speed increases beyond the threshold speed v before the time measured by the congestion detecting interval timer TM reaches the decision time t, the congestion detecting means 23 exits the congestion deciding loop in step ST58 and resets the congestion detecting interval timer TM in step ST53.

When it is decided that the vehicle is stopped or involved in traffic congestion, the congestion detecting means 23 makes a query in step ST64 to see if the present position set as "Place 1" is equal to "Detection starting position" set in step ST60. If the response in step ST64 is affirmative, it is decided that the vehicle is stopped and the routine returns to ST53. If the response in step ST64 is negative, it is decided that the vehicle is involved in traffic congestion, i.e., the roads are "Contested", and a signal representing "Congested" is given to a congested place estimating means 26 in step ST65.

Third Embodiment

The foregoing embodiments decides that the vehicle is involved in traffic congestion when traveling speeds not higher than the threshold speed v are detected successively in the predetermined decision time. However, it is also possible to calculate the mean traveling velocity of the vehicle at a speed sampling interval t and to decide that the vehicle is involved in traffic congestion when mean traveling speeds not higher than a threshold speed v appear successively a plurality of times not smaller than a predetermined number m of decision cycles. A vehicle guidance system in a third embodiment according to the present invention employs the latter method for deciding that the vehicle is involved in traffic congestion.

Figure 13:
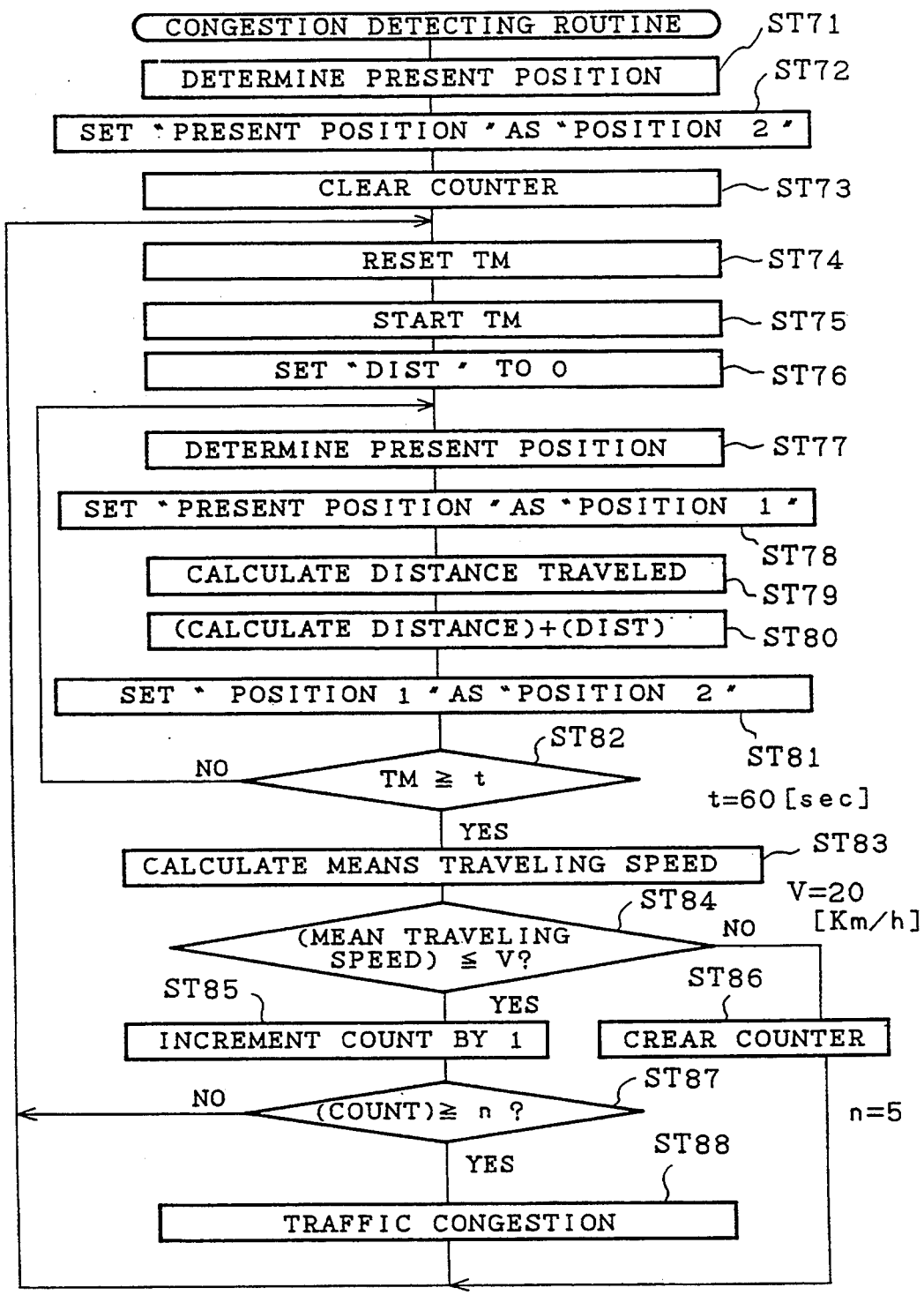
FIG. 13 is a flow chart of a congestion detecting procedure to be executed by a vehicle guidance system in a third embodiment according to the present invention.

The third embodiment will be described hereinafter on an assumption that the speed sampling interval t=1 min, the threshold speed v=20 km/hr and the predetermined number m=5. The functional configuration of the vehicle guidance system in the third embodiment is the same as that shown in FIG. 2, and the arrangement of the concrete components of the same is the same as that shown in FIG. 3. The general operation of the vehicle guidance system in the third embodiment is the same as that represented by the flow chart shown in FIG. 5, except that the vehicle guidance system in the third embodiment executes a congestion detecting procedure shown in FIG. 13 in step ST8.

In operation, a congestion detecting means 23 receives "Present position" from a present position detecting means 21 in step ST71, sets received "Present position" as "Place 2" in step ST72, clears a counter to zero in step ST73, resets a congestion detecting interval timer TM in step ST74, and then starts the congestion detecting interval timer TM in step ST75.

The congestion detecting means 23 sets "Dist", i.e., a distance traveled by the vehicle, at zero in step ST76. Then, the congestion detecting means 23 receives "Present position" again from the present position detecting means 21 in step ST77 and sets "Present position" as "Place 1" in step ST78. Then, the congestion detecting means 23 calculates the distance between "Place 1" and "Place 2", i.e., the distance traveled by the vehicle, in step ST79. When "Place 1" is indicated by coordinates (x1, y1) and "Place 2" is indicated by coordinates (x2, y2), the distance traveled by the vehicle can be calculated by:

$$\text{Traveled distance} = \sqrt{(x1 - x2)^2 + (y1 - y2)^2} \quad (2)$$

In step ST80, the congestion detecting means adds the calculated traveled distance to "Dist", and then sets the place set as "Place 1" to "Place 2" in step ST81. In step ST82, a query is made to see if the time measured by a congestion detecting interval timer TM is equal to or longer than a predetermined speed sampling interval t (60 sec). The routine returns to step ST77 if the response in step ST82 is negative or goes to step ST83 if the response in step ST82 is affirmative. The distance of travel "Dist" within the speed sampling interval t is determined by steps ST74 through ST82. Then, in step ST83, the congestion detecting means 23 calculates the mean traveling speed (km/hr) in the speed sampling interval t by using:

$$\text{Mean traveling speed (Km/hr)} = \text{"Dist"}/(1/60) \quad (3)$$

Then, in step ST84, the congestion detecting means 23 makes a query to see if the calculated mean traveling speed is equal to or lower than a threshold speed v. The counter is cleared in step ST86 and the routine returns to step ST74 if the response in step ST84 is negative. If the response in step ST84 is affirmative, the count of the counter is incremented by one in step ST87. In step ST87, a query is made to see if the count of the counter is equal to or greater than the predetermined number m. The routine returns to step ST74 if the response in step ST87 is negative. If the response in step ST87 is affirmative, it is decided that the vehicle is involved in traffic congestion and a signal indicating "Congested" is given to a congested place estimating means 26 in step ST88.

Fourth Embodiment

The third embodiment decides that the vehicle is involved in traffic congestion when the mean traveling speeds not higher than the threshold speed v are detected a plurality of times not smaller than the predetermined number m of decision cycles successively. However, it may be decided that the vehicle is involved in traffic congestion when the ratio of the number of mean speeds not higher than the threshold speed v to the number of mean speeds determined in the recent m decision cycles is not smaller than a predetermined value r. A vehicle guidance system in a fourth embodiment according to the present invention employs the latter method for deciding that the vehicle is involved in traffic congestion.

Figure 14:
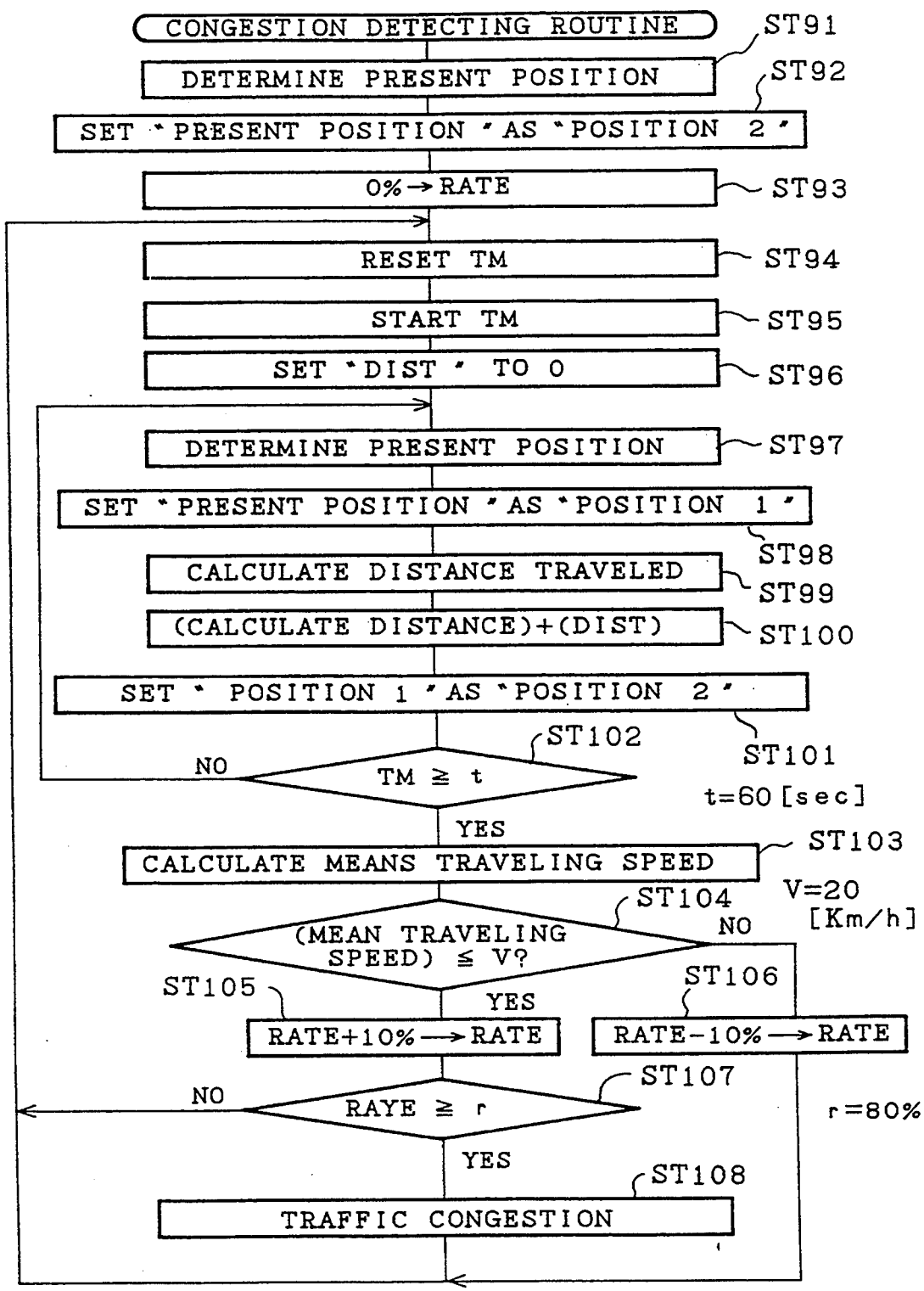
FIG. 14 is a flow chart of a congestion detecting procedure to be executed by a vehicle guidance system in a fourth embodiment according to the present invention.

The vehicle guidance system in the fourth embodiment will be described on an assumption that the predetermined number m=10, the threshold speed v=20 km/hr and the predetermined value r=80%. Since the predetermined number m of decision cycles is ten, the ratio of the number of a mean traveling speed determined in each decision cycle to the number of mean traveling speeds determined by m decision cycles is 10%. The functional configuration of the vehicle guidance system in the fourth embodiment is the same as that shown in FIG. 2 and the arrangement of the concrete components of the same is the same as shown in FIG. 3. The general operation of the vehicle guidance system in the fourth embodiment is the same as that represented by the flow chart shown in FIG. 5, except that the vehicle guidance system in the fourth embodiment executes a congestion detecting procedure represented by a flow chart shown in FIG. 14 in step ST8.

In operation, a congestion detecting means 23 receives "Present position" from a present position detecting means 21 in step ST91, sets "Present position" as "Place 2" in step ST92, sets congestion detecting rate "Rate" at 0% in step ST93, resets a congestion detecting interval timer TM in step ST94, starts the congestion detecting interval timer TM in step ST95, and then sets "Dist", i.e., a distance of travel of the vehicle at zero in step ST96.

The congestion detecting means 23 receives "Present position" again from the present position detecting means 21 in step ST97 and sets "Present position" as "Place 1" in step ST98. Then, the congestion detecting means 23 calculates the distance between "Place 1" and "Place 2", i.e., the distance traveled by the vehicle, in step ST99. For example, when "Place 1" is indicated by coordinates (x1, y1) and "Place 2" is indicated by coordinates (x2, y2), the distance between "Place 1" and "Place 2" can be calculated by using the expression (2).

The congestion detecting means 23 adds the calculated distance and "Dist" in step ST100, and then sets the place set as "Place 1" to "Place 2" in step ST101. Then, a query is made in step ST102 to see if the time measured by a congestion detecting interval timer TM is equal to or longer than a predetermined speed sampling time t (for example, 60 sec). The routine returns to step ST97 if the response in step ST102 is negative or goes to step ST103 if the response in step ST102 is affirmative. The distance "Dist" (km) of travel of the vehicle in the speed sampling time t can be determined by steps ST94 through ST102. The congestion detecting means 23 calculates a mean traveling speed (km/hr) in the speed sampling time t by using the expression (3).

The congestion detecting means 23 compares the mean traveling speed calculated in step ST103 with the threshold speed v in step ST104. The routine goes to step ST106 if the mean traveling speed is higher than the threshold speed v or goes to step ST105 if the mean traveling speed is not higher than the threshold speed v. When it is decided in step ST104 that the mean traveling speed is higher than the threshold speed v, the congestion detecting rate "Rate" is decreased by 10% in step ST106, and then the routine returns to step ST94. The lower limit of the congestion detecting rate "Rate" is 0%.

When the mean traveling speed is not higher than the threshold speed v, 10% is added to the congestion detecting rate "Rate" in step ST105. The upper limit of the congestion detecting rate "Rate" is 100%. In step ST107, the congestion detecting rate "Rate" is compared with the predetermined value r (80%). The routine returns to step ST94 if the congestion detecting rate "Rate" is less than the predetermined value r or it is decided that the vehicle is involved in traffic congestion and a signal "Congested" is given to a congested place estimating means 26 in step ST108 if the congestion detecting rate "Rate" is not smaller than the predetermined value r.

Thus, when the ratio of the number of mean traveling speeds lower than 20 km/hr to the number of mean traveling speeds determined by ten mean traveling speed determining cycles is 80% or greater, it is decided that the vehicle is involved in traffic congestion.

Although the foregoing embodiments employs the fixed threshold speed v of 20 km/hr for all classes of roads, different threshold speeds may be used for different classes of roads. For example, it is possible that v=30 km/hr for express ways, v=20 km/hr for national highways and v=10 km/hr for prefectural roads, principal local roads and local roads.

The foregoing embodiments uses the classes of roads meeting at each junction as a parameter for congested place estimation. However, as shown by way of example in a congestion estimation factor table shown in FIG. 15, the types of junctions may be represented by the number of roads meeting at the junctions and congestion estimation factors may be assigned to the numbers of roads meeting at the junctions. It is also possible to use a two-dimensional congestion estimation factor table as shown in FIG. 16, in which the type of each junction is specified by the classes of roads meeting at the junction and the number of roads meeting at the junction, and a congestion estimation factor is assigned to each type of junction. Furthermore, it is possible to use a congestion estimation factor table as shown in FIG. 17, in which the type of each junction is specified on the basis of the widths of roads meeting at the junction. Still further, it is also possible to use a congestion estimation factor table as shown in FIG. 18, in which the type of each junction is specified on the basis of causes of traffic congestion, such as tunnels and bridges.

It is noted that the values shown in those congestion estimation factor tables are only examples and are subject to change according to the associated conditions.

Fifth Embodiment

The foregoing embodiments uses the class of roads meeting at each junctions as a parameter for congested place estimation. The classes of roads meeting at junctions, the number of roads meeting at each junction, the widths of roads meeting at each junction and factors of congestion, such as tunnels and bridges, on roads meeting at each junction may be used in combination for congested place estimation. A vehicle guidance system in a fifth embodiment according to the present invention uses such a plurality of factors of congestion in combination for congested place estimation.

The functional configuration of the vehicle guidance system in the fifth embodiment is the same as that shown in FIG. 2 and the arrangement of the concrete components of the same is the same as that shown in FIG. 3. The general operation of the vehicle guidance system in the fifth embodiment is the same as that represented by the flow chart shown in FIG. 5, except that the vehicle guidance system in the fifth embodiment executes a congestion estimation factor attaching procedure represented by a flow chart shown in FIG. 19 in step ST42.

The operation of the vehicle guidance system will be described hereinafter with reference to FIGS. 10 and 19. A congested place estimating means 26 determines the classes of roads meeting at each of the junctions sampled instep ST41, making reference to the road data read from a road data storage means 28. The relevant congestion estimation factors shown in FIG. 11 are attached respectively to the corresponding junctions by the congested place estimating means 26 in step ST111. For example, when the junctions 103, 104, 105, 106 and 107 shown in FIG. 6 are sampled in step ST41, a congestion estimation factors 3.0, 4.0, 3.0, 5.0 and 3.0 are attached respectively to the junctions 103, 134, 105, 106 and 107, making reference to the congestion estimation factor table showing different types of junctions identified by the classes of roads meeting at the junctions, and congestion estimation factors assigned respectively to those junctions.

Then, the congested place estimating means 26 counts the number of roads meeting at each of the sampled junctions on the basis of the road data, and then attaches the congestion estimation factors tabulated in the congestion estimation factor table shown in FIG. 15 to the relevant junctions in step ST112. In this case, the number of roads meeting at each of the junctions 103, 104, 105, 106 and 107 is not greater than four. Consequently, the congestion estimation factors attached respectively to the junctions 103, 104, 105, 106 and 107 are 3.0, 4.0, 3.0, 5.0 and 3.0.

Then, the congested place estimating means 26 finds out the widths of the roads meeting at the sampled junctions, and then further attaches the congestion estimation factors tabulated in the congestion estimation factor table shown in FIG. 17 to the sampled junctions in step ST113. In this case, the junction 103 is a junction connected to only ③, the junction 104 is a junction connected to ④, the junction 105 is a junction connected to ④, the junction 106 is a junction connected to ④, and the junction 107 is a junction connected to ③. The congestion estimation factors tabulated in the congestion estimation factor table shown in FIG. 17 are attached to the relevant junctions. Consequently, the congestion estimation factors attached respectively to the junctions 103, 104, 105, 106 and 107 at this stage are 7.0, 9.0, 8.0, 10.0 and 7.0.

Then, the congested place estimating means 26 searches the road data for causes of congestion on the roads meeting at the sampled junctions and further attaches the congestion estimation factors tabulated in the congestion estimation factor table shown in FIG. 18 to the relevant roads in step ST114. In this case, a road connected to the junction 104 has a bridge. Consequently, the congestion estimation factors attached respectively to the junctions 103, 104, 105, 106 and 107 at this stage are 7.0, 9.3, 8.0, 10.0 and 7.0

The congested place estimating means 26 executes steps ST43 through ST45, using those congestion estimation factors.

Although the first embodiment weights the roads between the present position and the junction estimated to be causing traffic congestion, it is also possible to weight the roads between the present position and the junction estimated to be causing traffic congestion, and the roads meeting at the junctions between the present position and the junction estimated to be causing traffic congestion.

The foregoing embodiments have been described with reference to a case in which a new recommendable route is found after multiplying the lengths of the congested roads by 5 or multiplying the traveling speed by 1/5; that is, the weighting factor is a fixed value. However, different weighting factors may be used respectively for weighting different classes of roads. For example, when an express way is estimated to be congested, the length of the same is multiplied by 10 or the traveling speed on the same is multiplied by 1/10, when a national highway is estimated to be congested, the length of the same is multiplied by 8 or the traveling speed on the same is multiplied by 1/8, when a prefectural road is estimated to be congested, the length of the same is multiplied by 6 or the traveling speed on the same is multiplied by 1/6, when a principal local road is estimated to be congested, the length of the same is multiplied by 4 or the traveling speed on the same is multiplied by $\frac{1}{4}$, and when a local road is estimated to be congested, the length of the same is multiplied by 2 or the traveling speed on the same is multiplied by $\frac{1}{2}$.

Although the foregoing embodiments present visual information on the CRT display serving as the presentation means 27, it is also possible to provide audio information.

Sixth Embodiment

A vehicle guidance system in a sixth embodiment according to the present invention will be described hereinafter. This vehicle guidance system employs a brake sensor 36 for congestion detection. A congestion detecting means 23 decides whether or not the road is congested, on the basis of braking modes. The functional configuration of the vehicle guidance system in the sixth embodiment is the same as that shown in FIG. 2 and the arrangement of the concrete components of the same is the same as that shown in FIG. 3. The general operation of the vehicle guidance system in the sixth embodiment is the same as that represented by the flow chart shown in FIG. 5, except that the vehicle guidance system in the sixth embodiment executes a congestion detecting procedure represented by a flow chart shown in FIG. 20 in step ST8.

A congestion detecting means 23 resets a congestion detecting interval timer TM2 in step ST121, resets a braking interval detecting timer TM1 in step ST122, and then starts the braking interval detecting timer TM1 in step ST123. In step ST124, the congestion detecting means 23 makes a query to see if the brake is applied. The brake sensor 36 generates an interrupt in the congestion detecting means 23 when the brake is applied.

Upon the detection of application of the brake, the congestion detecting means 23 makes a query in step ST125 to see if the time measured by the braking interval detecting timer TM1 is shorter than a predetermined congestion braking interval t1 (for example, 30 sec). The routine goes to step ST126 if the response in step ST125 is affirmative or returns to step ST121 if the response in step ST125 is negative.

In step ST126, the congestion detecting means 23 makes a query to see if the congestion detecting interval timer TM2 is in operation. The congestion detecting means 23 starts the congestion detecting interval timer TM2 in step ST127 if the response in step ST126 is negative, and then the routine returns to step ST122. If the response in step ST126 is affirmative, a query is made in step ST128 to see if the time measured by the congestion detecting interval timer TM2 is equal to or longer than a predetermined congestion detecting time t2 (for example, 10 min). If the response in step ST128 is negative, the routine returns to step ST122. If the response in step ST128 is affirmative, the congestion detecting means 23 decides that the vehicle is involved in traffic congestion and sends a signal "Congested" to a congested place estimating means 26 in step ST129.

Thus, in the sixth embodiment, it is decided that the vehicle is involved in traffic congestion when a braking mode in which braking intervals are not longer than the congestion braking interval t1 continues for a time interval not shorter than the congestion detecting time t2. However, it is also possible to decide that the vehicle is involved in traffic congestion when braking cycles not longer than the congestion braking interval t1 (for example, 30 sec) are repeated successively a plurality of times not less than a predetermined number n of times (for example, twenty times).

Although, in this embodiment, the congestion braking interval t1 (for example, 30 sec) and the congestion detecting time t2 (for example, 10 min) are used for detecting the congestion of all classes of roads, different congestion braking intervals and different congestion detecting times may be used for detecting the congestion of different classes of roads, respectively. For example, t1=60 sec and t2=5 min are used when the vehicle is traveling on an express way, t1=40 sec and t2=10 min are used when the vehicle is traveling on a national highway, t1=20 sec and t2=15 min are used when the vehicle is traveling on a prefectural road, a principal local road or a local road.

Seventh Embodiment

Figure 21:
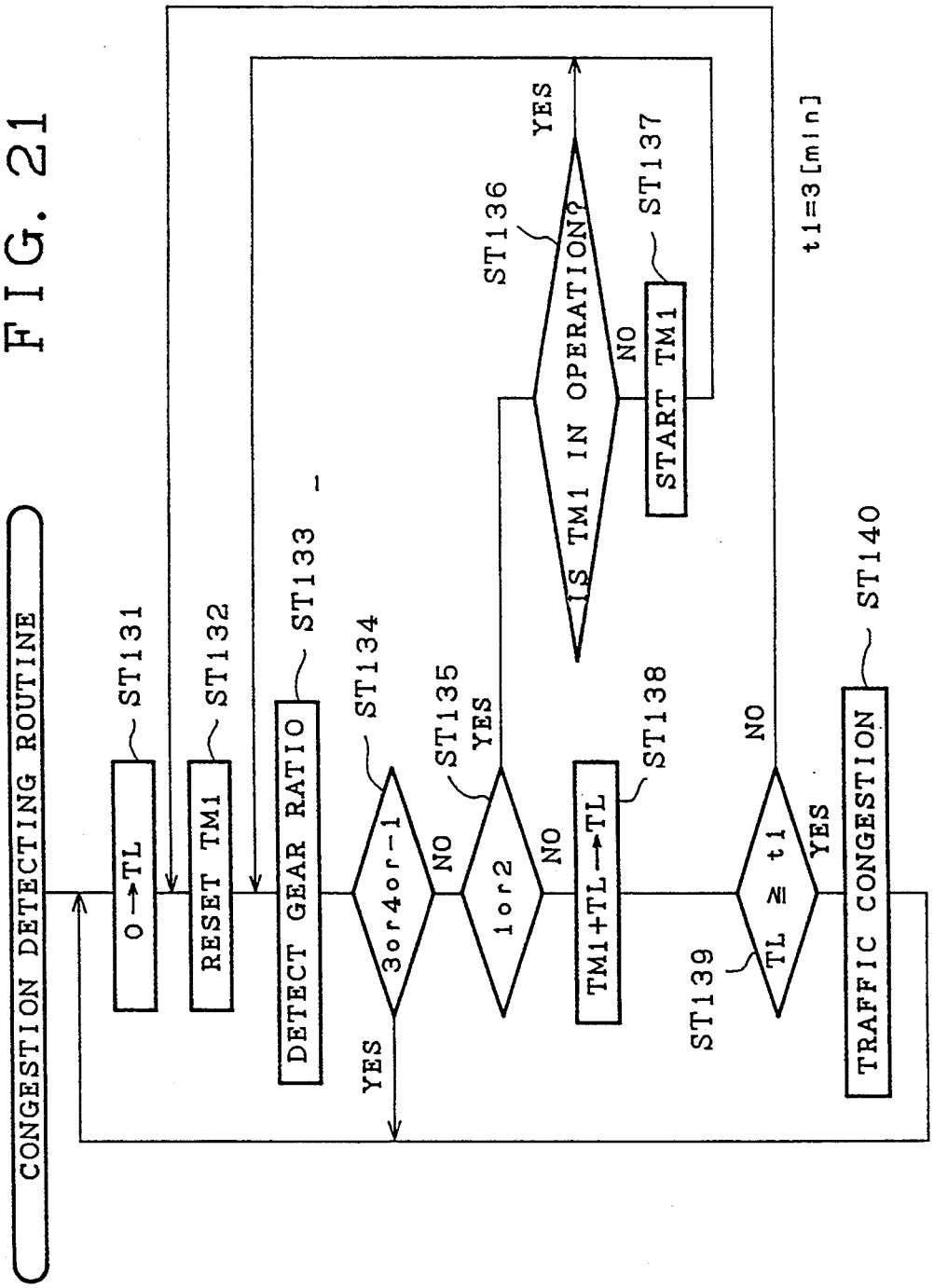
FIG. 21 is a flow chart of a congestion detecting procedure to be executed by a vehicle guidance system in a seventh embodiment according to the present invention.

A vehicle guidance system in a seventh embodiment according to the present invention will be described hereinafter. This vehicle guidance system uses the gear ratio sensor 37 for congestion detection. A congestion detecting means 23 decides whether or not the vehicle is involved in traffic congestion on the basis of the selected gear of the transmission and the duration of the use of the selected gear. The functional configuration of the vehicle guidance system in the seventh embodiment is the same as that shown in FIG. 2 and the arrangement of the concrete components of the same is the same as that shown in FIG. 3. The general operation of the vehicle guidance system in the seventh embodiment is the same as that represented by the flow chart shown in FIG. 5, except that the vehicle guidance system executes a congestion detecting procedure represented by a flow chart shown in FIG. 21 in step ST8.

The congestion detecting means 23 sets the congestion speed total time TL at zero second in step ST131, resets a congestion speed timer TM1 in step ST132, and then detects selected gear of the transmission in step ST133. For example, the gear ratio sensor 37 for detecting selected gear of the transmission of the vehicle provides a signal "1" for the low gear, a signal "2" for the second gear, a signal "3" for the third gear, a signal "4" for the top gear, a signal "−1" for the reverse and a signal "0" for the neutral.

The congestion detecting means 23 decides in step ST134 that the vehicle is not involved in traffic congestion when the third gear (signal "3"), the top gear (signal "4") or the reverse (signal "−1") is selected, and the routine returns to step ST131. When the low gear (signal "1") or the second gear (signal "2") is selected, the congestion detecting means 23 starts the congestion selected gear timer TM1 in step ST137 if the congestion selected gear timer TM1 is not started (ST136), and the routine returns to step ST133. If the congestion selected gear timer TM1 is in operation, the routine returns from step ST136 directly to step ST133. The congestion selected gear timer TM1 is started when the low ratio or the second ratio is established for the first time.

When the transmission is at the neutral (signal "0"), the congestion detecting means 23 makes a query in step ST139 to see if the congestion selected gear total time TL is equal to or longer than a predetermined congestion detecting time t1 (for example, 3 min). The routine returns to step ST132 if the response in step ST139 is negative or goes to step ST140 if the response in step ST139 is affirmative. In step ST140, the congestion detecting means 23 decides "Congested" because the duration when the second gear is selected (signal "2") or the neutral (signal "0") is longer than the congestion detecting time t1, and then gives a signal representing "Congestion" to a congested place estimating means 26.

In this embodiment, the congestion detecting time t1 is fixed at, for example, 3 min for all classes of roads. However, different congestion detecting times may be used for different classes of roads. For example, a congestion detecting time t1=1 min for an express way, a congestion detecting time t1=2 min for a national highway and a congestion detecting time t1=3 min for a prefectural road, a principal local road and a local road may be used.

Eighth Embodiment

Figure 22:
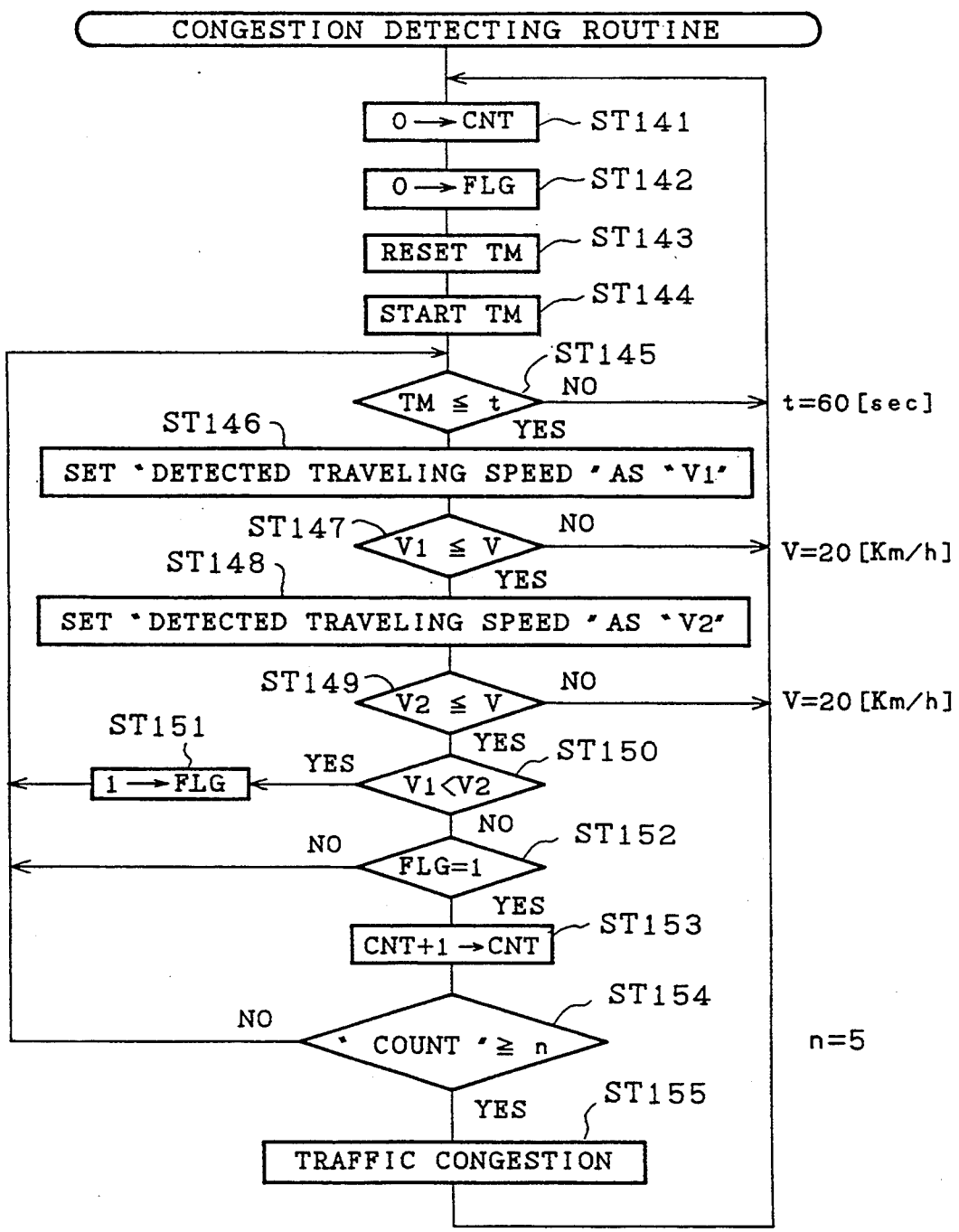
FIG. 22 is a flow chart of a congestion detecting procedure to be executed by a vehicle guidance system in an eighth embodiment according to the present invention.

A vehicle guidance system in an eighth embodiment according to the present invention will be described hereinafter. This vehicle guidance system uses the traveling speed sensor 38 for congestion detection. The functional configuration of the vehicle guidance system in the eighth embodiment is the same as that shown in FIG. 2 and the arrangement of the concrete components of the same is the same as that shown in FIG. 3. The general operation of the vehicle guidance system in the eighth embodiment is the same as that represented by the flow chart shown in FIG. 5, except that the vehicle guidance system executes a congestion detecting procedure represented by a flow chart shown in FIG. 22 in step ST8. A congestion detecting means 23 detects deceleration count, namely, the frequency of deceleration of the traveling speed in a congestion detecting time t (for example, 60 sec), and decides that the vehicle is involved in traffic congestion when the deceleration count is equal to or greater than a congestion deceleration frequency n (for example, five times in the congestion detecting time t) and the traveling speed is not higher than a threshold speed v (for example, 20 km/hr).

First the congestion detecting means 23 sets deceleration count "CNT" at zero in step ST141, sets an acceleration flag "FLG" to 0 state n step ST142, resets a congestion detecting interval timer TM in step ST143, and then starts the congestion detecting interval timer TM in step ST144.

Then, the congestion detecting means 23 makes a query in step ST145 to see if the time measured by the congestion detecting interval timer TM is equal to or shorter than the congestion detecting time t (for example, 60 sec). The routine returns to step ST141 if the response in step ST145 is negative. If the response in step ST145 is affirmative, the congestion detecting means 23 receives a signal representing the traveling speed of the vehicle from the traveling speed sensor 38 and sets the traveling speed as a first traveling speed v1 in step ST146. The congestion detecting means 23 makes a query to see if the first traveling speed v1 is equal to or lower than a predetermined threshold speed v (for example, 20 km/hr). The routine returns to step ST141 if the response in step ST147 is negative. The congestion detecting means 23 receives a signal representing the traveling speed of the vehicle from the traveling speed sensor 38 and sets the traveling speed as a second traveling speed v2 in step ST148 if the response in step ST147 is affirmative.

Then, the congestion detecting means 23 makes a query in step ST149 to see if the second traveling speed v2 is equal to or lower than the predetermined threshold speed v. The routine returns to step ST141 if the response in step ST149 is negative. If the response in step ST149 is affirmative, the congestion detecting means 23 makes a query in step ST150 to see if the first traveling speed v1 is lower than the second traveling speed v2. The congestion detecting means 23 decides that the vehicle is accelerated and sets the acceleration flag "FLG" to 1 state in step ST151 if the response in step ST150 is affirmative. If the response in step ST150 is negative, the congestion detecting means 23 makes a query in step ST152 to see if the acceleration flag "FLG" is in 1 state. If the response in step ST152 is negative, the routine returns to step ST145.

If the response in step ST152 is affirmative, the previous decision is "Accelerated". Since the response in step ST150 is negative, i.e., the second traveling speed v2 is lower than the first traveling speed v1, the decision made in step ST152 is accelerated". In this case, the congestion detecting "Not means 23 increments deceleration count "CNT" by one in step ST153 and makes a query in step ST154 to see if deceleration count "CNT" is equal to or greater than the predetermined congestion deceleration frequency n (for example five times). If the response in step ST154 is negative, the routine returns to step ST145. If the response in step ST154 is affirmative, the congestion detecting means 23 decides that the vehicle is involved in traffic congestion and gives a signal "Congested" to a congested place estimating means 26 in step ST155.

Thus, the congestion detecting means 23 decides that the vehicle is involved in traffic congestion when the traveling mode of the vehicle is changed from an accelerating mode to a decelerating mode, the decelerating mode continues for a predetermined period and the traveling speed of the vehicle is not higher than, for example, 20 km/hr.

Although the congestion deceleration frequency n is a fixed value for all classes of roads in this embodiment, different congestion deceleration frequencies may be used respectively for different classes of roads. For example, n=3 for an express way, n=5 for a national highway, n=8 for a prefectural road, a principal local read and a local road may be used.

The traveling speed of the vehicle may be detected from the present position of the vehicle varying with time detected by a present position detecting means 21 instead of detecting the same by the traveling speed sensor 38.

Ninth Embodiment

Figure 23:
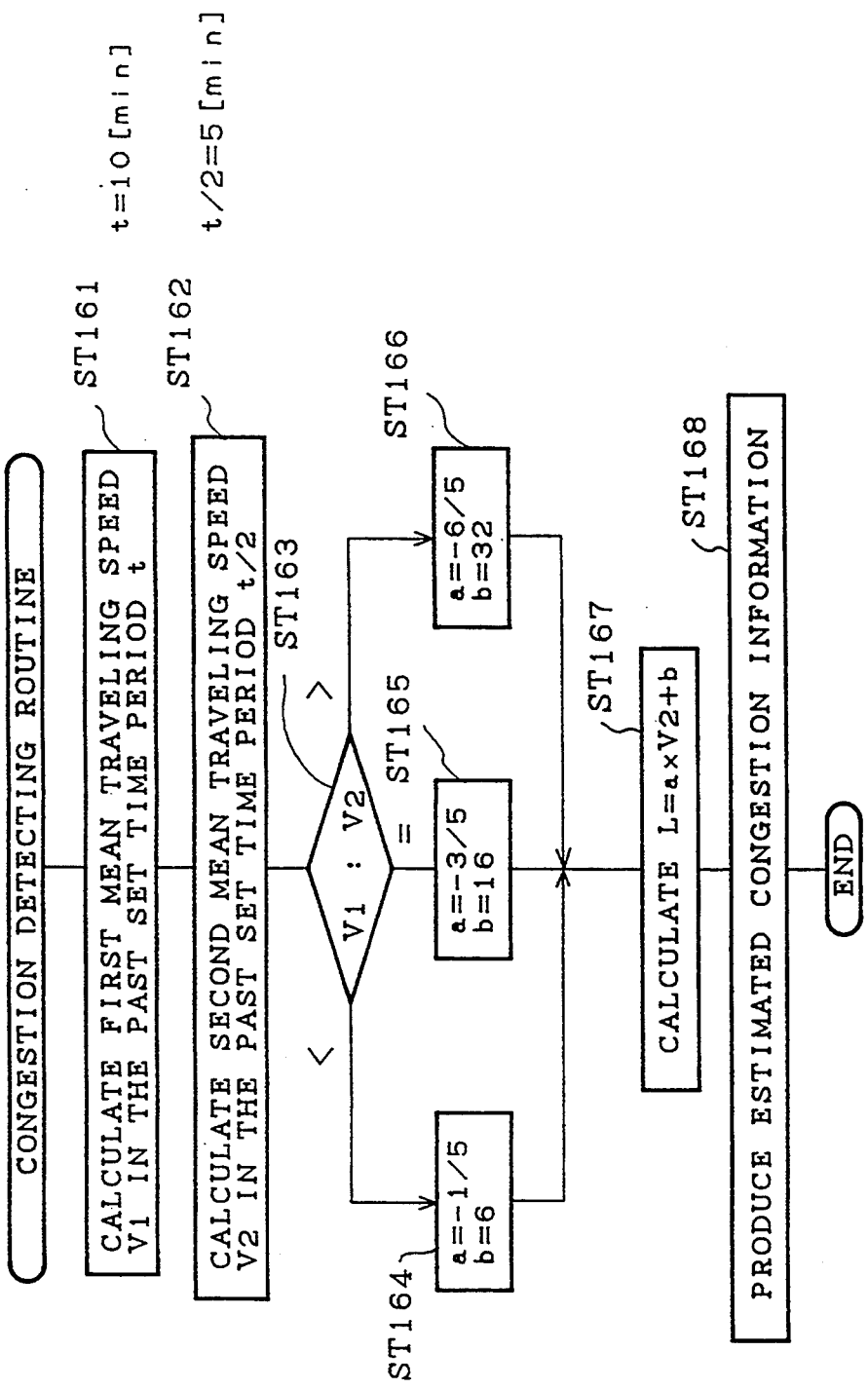
FIG. 23 is a flow chart of a congestion detecting procedure to be executed by a vehicle guidance system in a ninth embodiment according to the present invention.

A vehicle guidance system in a ninth embodiment according to the present invention will be described hereinafter. This vehicle guidance system uses the variation of the traveling speed of the vehicle after the vehicle has been involved in traffic congestion for congested place estimation. The functional configuration of the vehicle guidance system in the ninth embodiment is the same as that shown in FIG. 2 and the arrangement of the concrete components of the same is the same as that shown in FIG. 3. The general operation of the vehicle guidance system is the same as that represented by the flow chart shown in FIG. 5, except that the vehicle guidance system executes a congested place estimating procedure represented by a flow chart shown in FIG. 23 in step ST10.

In operation, a congested place estimating means 26 receives a signal representing the present position from a present position detecting means 21 and calculates the mean traveling speed in the the past predetermined time t (for example, 10 min) on the basis of a distance traveled by the vehicle and sets the calculated mean traveling speed as a first mean traveling speed v1 in step ST161. Then, the congested place estimating means 26 calculates, by a procedure similar to that executed in step ST161, the mean traveling speed in the past predetermined time t/2 (for example, 5 min) and sets the calculated traveling speed as a second mean traveling speed v2 in step ST162. Accordingly, if the distance traveled by the vehicle in the passed predetermined time t, for example, 10 min, is 2 km, the first mean traveling speed v1 can be calculated by using:

$$v1 = 2/(1/6) = 12 \text{ km/hr}$$

If the distance traveled by the vehicle in the past predetermined time t/2, for example, 5 min, is 1.5 km, the second mean traveling speed v2 can be calculated by using:

$$v2 = 1.5/(1/12) = 18 \text{ km/hr}$$

Then, the congested place estimating means 26 compares the first mean traveling speed v1 and the second mean traveling speed v2 in step ST163. If $v1 < v2$, i.e., if the vehicle is accelerated, it is possible to infer that the vehicle is escaping from traffic congestion. Therefore, the congested place estimating means 26 sets, for example, a coefficient a to $-1/5$ and sets a coefficient b to 6 in step ST164. If $v1 = v2$, i.e., the vehicle is traveling at a constant traveling speed, it is possible to infer that the vehicle is amid traffic congestion. Therefore, the congested place estimating means 26 sets for example, the coefficient a to $-3/5$ and sets the coefficient b to 16 in step ST165. If $v1 > v2$, i.e., if the vehicle is being decelerated, it is possible to infer that the vehicle has just encountered traffic congestion. Therefore, the congested place estimating means 26 sets, for example, the coefficient a to $-6/5$ and sets the coefficient b to 32 in step ST166.

Then, the congested place estimating means 26 calculates congestion length L, namely, the length of a congested section, by using the coefficients a and b set in step ST164, ST165 or ST166, the mean traveling speed v2 in the past predetermined time t/2 calculated in step ST162 and an expression:

$$L = a \times v2 + b \qquad (4)$$

Figure 24:
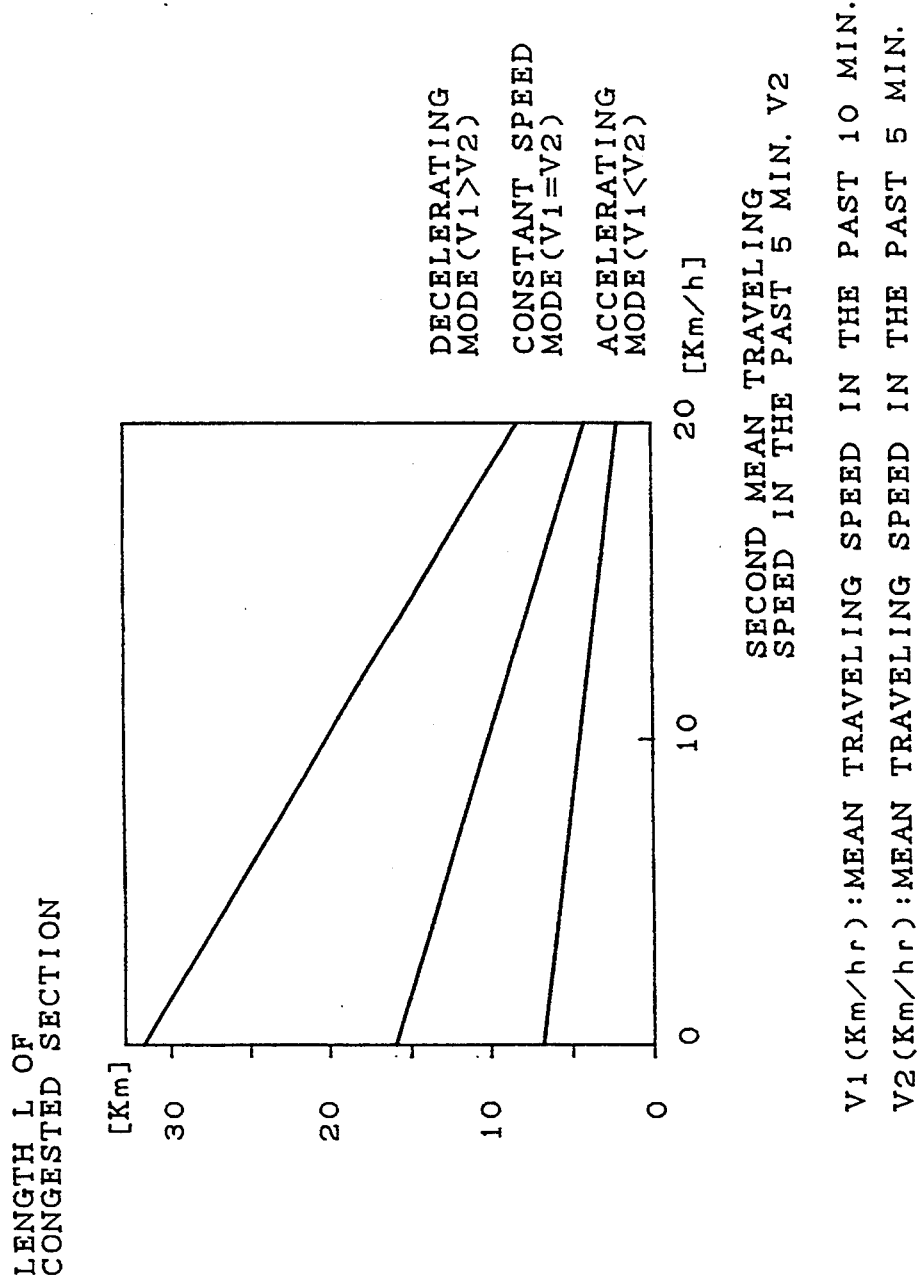
FIG. 24 is graph showing the relation between mean traveling speed and the length of a congested section.

For example, when v1=12 km/hr and v2=18 km/hr, the vehicle is being accelerated and hence a=$-1/5$ and b=6. These values are substituted in the expression (4) to calculate L=2.4 km. FIG. 24 shows the general relation between the congestion distance L and the second mean traveling speed v2 for an accelerating mode, a decelerating mode and a constant traveling speed mode, in which the second mean traveling speed v2 in the past predetermined time t/2 (min) (for example, 5 min) is measured on the horizontal axis and the congestion length L (km) is measured on the vertical axis.

Then, the congested place estimating means 26 decides that a section having the calculated congestion length L of the recommended route ahead of the present position of the vehicle is congested on the basis of the calculated congestion length L, the present position of the vehicle detected by a present position detecting means 21 and the data of the recommended route found by a routing means 24, produces estimated congestion information and gives the estimated congestion information to a road data weighting means 25 and a congestion length calculating means 29 in step ST168.

For example, in FIG. 6, when the present position "Present position B" of the vehicle, namely, a position marked with a cross in FIG. 6, is 0.2 km behind the junction 103 and L=2.4 km, the estimated congestion information indicates the junctions in a section between the "Present position" and a position 2.4 km ahead of the "Present position". In FIG. 6, the junctions 103, 104 and 105 included in the estimated congested section.

The values of the coefficients a and b referred to in the foregoing description are only examples and may be any suitable values determined taking into consideration the condition of the environment of the recommended route.

Tenth Embodiment

Figure 25:
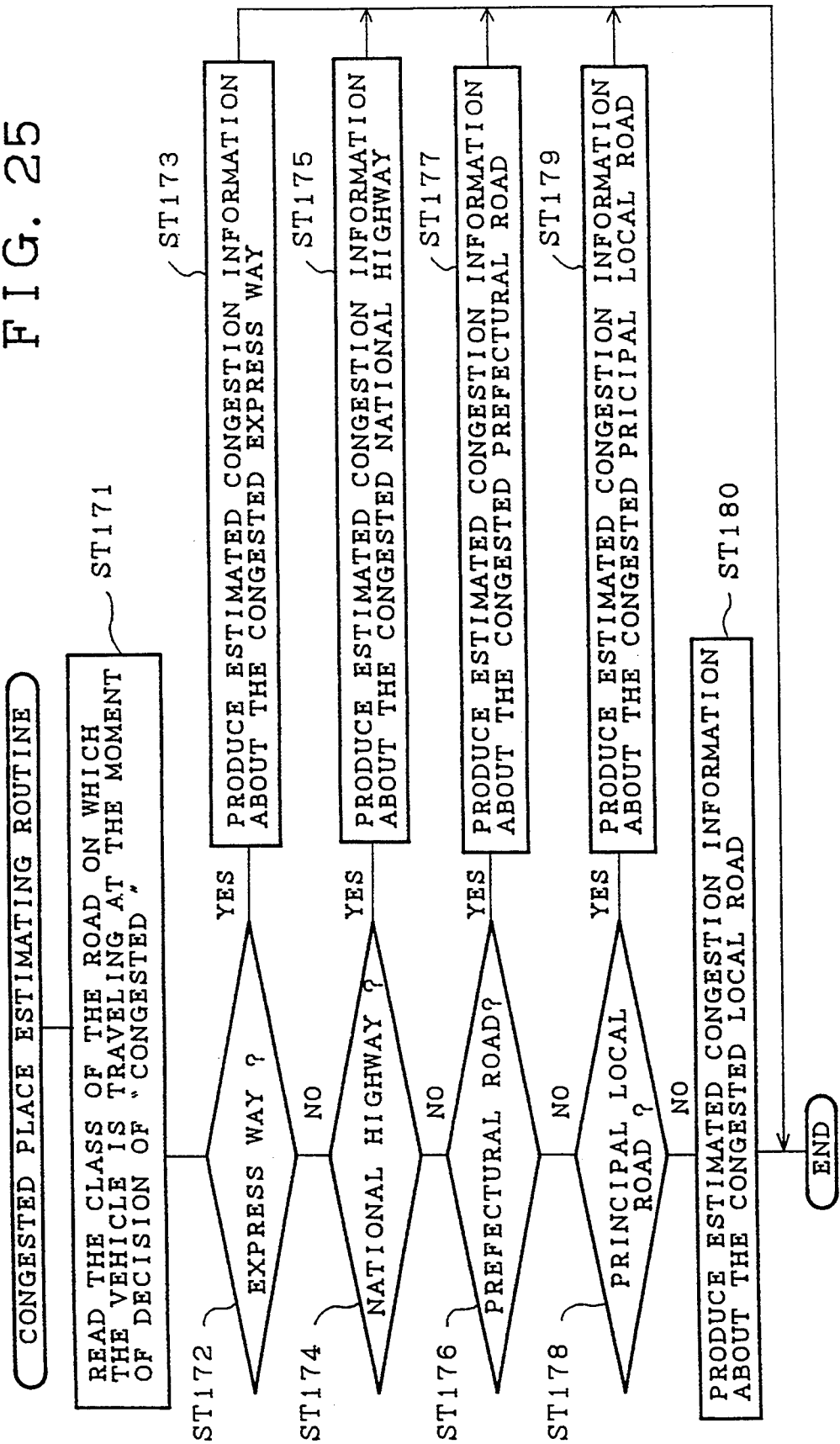
FIG. 25 is a flow chart of a congested place estimating procedure to be executed by a vehicle guidance system in a tenth embodiment according to the present invention.

A vehicle guidance system in a tenth embodiment will be described hereinafter. This vehicle guidance system uses the class of the road on which the vehicle is involved in traffic congestion for contested place estimation. The functional configuration of the vehicle guidance system in the tenth embodiment is the same as that shown in FIG. 2 and the arrangement of the concrete components of the same is the same as that shown in FIG. 3. The general operation of the vehicle guidance system is the same as that represented by the flow chart shown in FIG. 5, except that the vehicle guidance system executes a contested place estimating procedure represented by a flow chart in FIG. 25 in step ST10.

in operation, first a congested place estimating means 26 receives the present position of the vehicle from a present position detecting means 21 and road data from a road data storage means 28 to find the class of the road on which the vehicle is traveling at the present time in step ST171. Since the congested place estimating means 26 is actuated when traffic congestion is detected by a congestion detecting means 23, the object road is that on which the vehicle is traveling when the vehicle encountered traffic congestion.

Then, the congested place estimating means 26 makes a query in step ST172 to see if the road is an express way. If the response in step ST172 is affirmative, the congested place estimating means 26 produces estimated congestion information for the express way in step ST173, and the routine is ended. For example, since it is highly probable that an interchange is the starting position of a congested section on an express way, it is estimated that a section of the express way from the present position to the nth interchange, for example, the third interchange, from the present position is congested, and the numbers of the junctions in the estimated congested section are used as the estimated congestion information.

If the response in step ST172 is negative, a query is made in step ST174 to see if the road on which the vehicle is traveling is a national highway. If the response in step ST174 is affirmative estimated congestion information for the national highway is produced in step ST175 and the congested place estimating routine is ended. For example, it is highly probable that a congested section on a national highway is comparatively long, it is estimated that the entire section of the national highway extending ahead of the present position is congested, and the numbers of the junctions in the section are used as the estimated congestion information.

If the response in step ST174 is negative, a query is made in step ST176 to see if the road on which the vehicle is traveling is a prefectural road. If the response in step ST176 is affirmative, predicted congestion information about the congested prefectural road is produced in step ST177, and the congested place estimating routine is ended. Since it is highly probable that the congestion of a prefectural road is attributable to the congestion at the junction of an express way or a national highway, and the prefectural road, it is estimated that a section of the prefectural road between the present position of the vehicle and the junction of the prefectural road and an express way or a national highway is congested and the numbers of the junction in the presumably congested section are used as predicted congestion information.

If the response in step ST177 is negative, i.e., the road is not a prefectural road, a query is made in step ST178 to see if the road on which the vehicle is traveling is a principal local road. If the response in step ST178 is affirmative, predicted congestion information about a congested principal local road is produced in step ST179, and then the congested place estimating routine is ended. For example, since it is highly probable that the congestion of the principal local road is attributable to the congestion of the junction of the principal local road, and an express way, a national highway or a prefectural road, it is estimated that a section of the road between the present position of the vehicle and the junction of the principal local road, and an express way, a national highway or a prefectural load is congested and the numbers of the junctions between the present position of the vehicle and junction of the road on which the vehicle is traveling, and an express way, a national highway or a prefectural road are used as estimated congestion information.

If the response in step ST178 is negative, predicted congestion information about a local road is produced in step ST180, and the congested place estimating routine is ended. For example, since it is highly probable that the length of a congested section of a local road is comparatively short, it is estimated that a section between the present position of the vehicle and the nth junction, for example, the second junction, from the present position of the vehicle is congested, and the numbers of the junctions between the present position of the vehicle and the nth junction are used as estimated congestion information.

Referring to FIG. 6, the broad line indicates a recommended route found by a routing means 24, in which "Present position" marked with a cross is the present position of the vehicle where the congestion detecting means 23 decided "Congested". Since the road interconnecting the junctions 102 and 103 is a prefectural road indicated by [3], the congested place estimating means 26 estimates that a congested section is between the present position of the vehicle and a junction to which an express way or a national highway is joined. In FIG. 6, a national highway is joined to the junction 104, it is estimated that a section of the road between the present position of the vehicle and the junction 104 is congested, and the numbers of the junctions 103 and 104 are used as estimated congestion information.

Eleventh Embodiment

Figure 26:
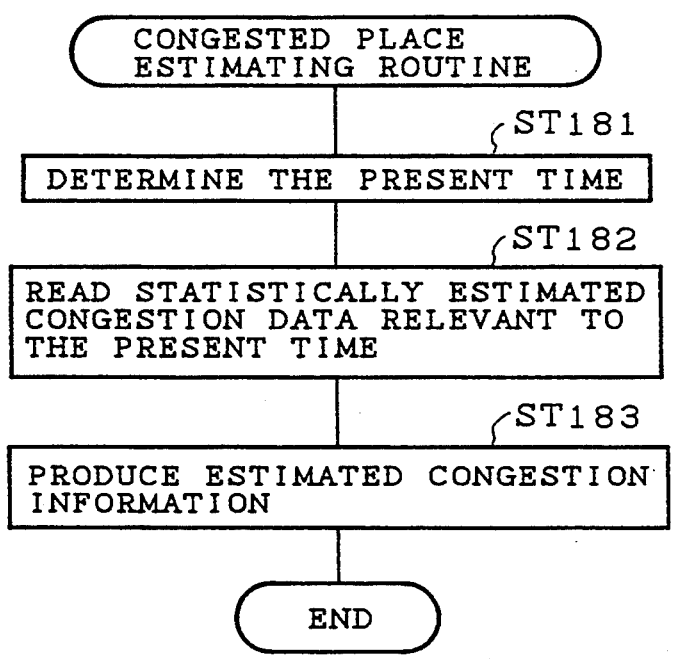
FIG. 26 is a flow chart of a congested place estimating procedure to be executed by a vehicle guidance system in an eleventh embodiment according to the present invention.

A vehicle guidance system in an eleventh embodiment according to the present invention will be described hereinafter. This vehicle guidance system uses congestion detection time and statistically estimated congestion data for congested place estimation. The functional configuration of the vehicle guidance system in the eleventh embodiment is the same as that shown in FIG. 2 and the arrangement of the concrete components of the same is the same as that shown in FIG. 3. The general operation of the vehicle guidance system is the same as that represented by the flow chart shown in FIG. 5, except that the vehicle guidance system executes a congested place estimating procedure represented by a flow chart shown in FIG. 26 in step ST10.

Figure 27:
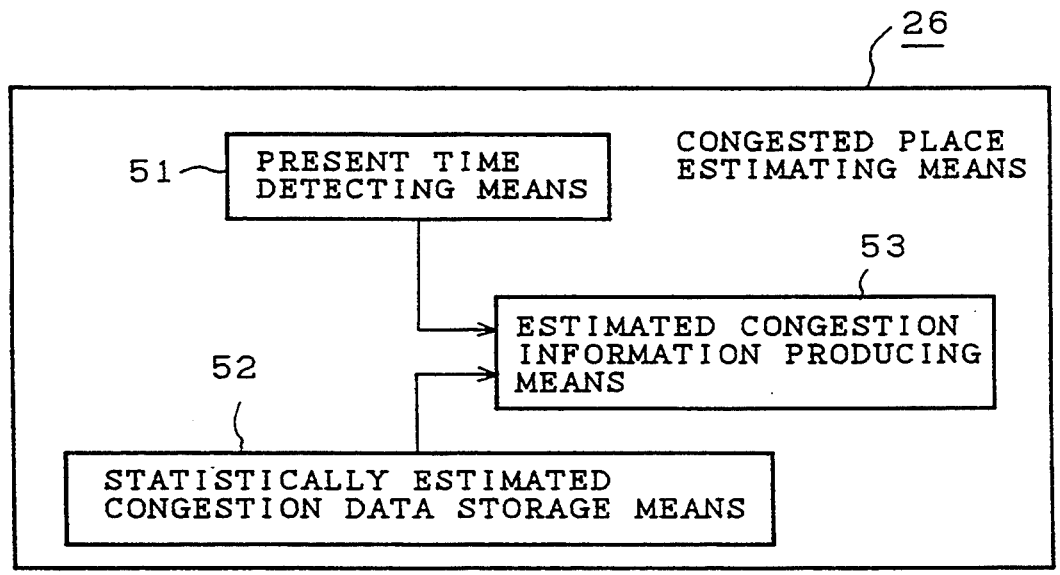
FIG. 27 is a block diagram of a congested place estimating unit included in the vehicle guidance system in the eleventh embodiment.

Referring to FIG. 27 showing a congested place estimating means 26 in the eleventh embodiment in a block diagram, a time registering means 51, such as a clock, registers the date, day of the week and the present time, such as "18:32:28, Tuesday, Nov. 30, 1993" and a statistically estimated congestion data storage means 52 stores statistically, estimated congestion data including statistically estimated time periods in which traffic congestion is liable to occur and the numbers of the corresponding junctions, such as information shown in FIG. 28.

In FIG. 28, numerals in the column indicated by "Junction Number" are the numbers of junctions respectively corresponding to those of the road data stored in a road data storage means 28, and numerals in the column indicated by "Congested Time Information" indicate statistically estimated time periods in which traffic congestion is liable to occur at the junctions. For example, It is expected that traffic congestion occurs at the junction 103 in a time period between 6:30 a.m. and 8:30 a.m.

An estimated congestion information producing means 53 produces estimated congestion information. When a congestion detecting means decides "Congested", the estimated congestion information producing means 53 receives the present time from the time registering means 51 and samples the number of a junction having a high probability of congestion from the statistically estimated congestion data storage means 52.

In operation, the estimated congestion information producing means 53 receives a signal representing the present time from the time registering means 51 in step ST181 and reads data corresponding to the present time from the statistically estimated congestion data storage means 52 in step ST182. Since a congested place estimating means 26 is actuated upon the detection of traffic congestion by a congestion detecting means 23, the present time coincides with the time when the vehicle encounters traffic congestion. Then, the estimated congestion information producing means 53 produces estimated congestion information on the basis of the received data and sends the estimated congestion information to a road data weighting means 25 and a congestion length calculating means 29 in step ST183.

For example, if the present time is "8:10:28, Tuesday, Nov. 30, 1993" and statistically estimated congestion data as shown in FIG. 27 is stored in the statistically estimated congestion data storage means 52, the estimated congestion information producing means 53 extracts the numbers of all the junctions having the congested time information including the time "8:10", decides that roads meeting at the extracted junctions are congested and produces estimated congestion information. In this case, the junctions 102, 103, 104, 109 and 114 are extracted and the junction numbers 102, 103, 104, 109 and 114 are used as the estimated congestion information.

Although the statistically estimated congestion data used in this embodiment includes the junctions and the corresponding time data, statistically estimated congestion data including roads between the two adjacent junctions and the corresponding time data may be used. When the latter statistically estimated congestion data is used, congestion information connected with the forward direction, and congestion information connected with the backward direction may be stored.

Although, only the information about congested time is stored as the statistically estimated congestion data in this embodiment, statistically estimated months, dates, days of the week and time periods in which traffic congestion is liable to occur may be stored as statistically estimated congestion data. Furthermore, the effect of traffic congestion, such as mean traveling speeds of the vehicle on congested roads, may be stored in combination with the information about congested time periods.

Twelfth Embodiment

A vehicle guidance system in a twelfth embodiment according to the present invention will be described hereinafter. This vehicle guidance system uses congestion detection time and statistically estimated congestion data for congested place estimation. The functional configuration of the vehicle guidance system in the twelfth embodiment is the same as that shown in FIG. 2 and the arrangement of the concrete components of the same is the same as that shown in FIG. 3. The general operation of the vehicle guidance system is the same as that represented by the flow chart shown in FIG. 5, except that the vehicle guidance system executes a congested place estimating procedure represented by a flow chart shown in FIG. 25 in step ST10. Information shown in FIG. 29 is stored in a statistically estimated data storage means 52.

In FIG. 29, shown in a column indicated by "Road Information" are the up side and the down side of each road between the adjacent junctions. For example, the up side and the down side of a road between the junctions 101 and 102 are shown in the first row. Shown in a column indicated by "Congested Period" is statistically estimated information about time periods in which traffic congestion is likely to occur at a high probability. In the column "Congested Period", shown in a subcolumn "Month" are statistically estimated months in which traffic congestion is likely to occur at a high probability, in a subcolumn "Date" are statistically estimated dates on which traffic congestion is likely to occur at a high probability, in a subcolumn "Day" are statistically estimated days of the week on which traffic congestion is likely to occur at a high probability, and in a subcolumn "Time Period" are statistically estimated time periods in which traffic congestion is likely to occur at a high probability. For example, a period in which traffic congestion is most likely to occur in the up side of the road between the junctions 102 and 103 is between 6:30 a.m. and 8:30 a.m. on a day among Monday through Friday and among 1st to 31st of a month among January through December. Shown in a column indicated by "Mean Traveling Speed under Congestion" are traveling speeds (km/hr) of the vehicle under traffic congestion. For example, in the second row, the mean traveling speed of the vehicle traveling the up side of the road between the junctions 102 and 103 is 10 km/hr.

Accordingly, from the table shown in FIG. 29, it is known that traffic congestion is likely to occur in the up side of the road between the junctions 102 and 103, the up side of the road between the junctions 103 and 104, the up side of the road between the junctions 104 and 109, and the up side of the road between the junctions 109 and 114 at 8:10:28 on Nov. 30, 1993, Tuesday.

Thirteenth Embodiment

Figure 30:
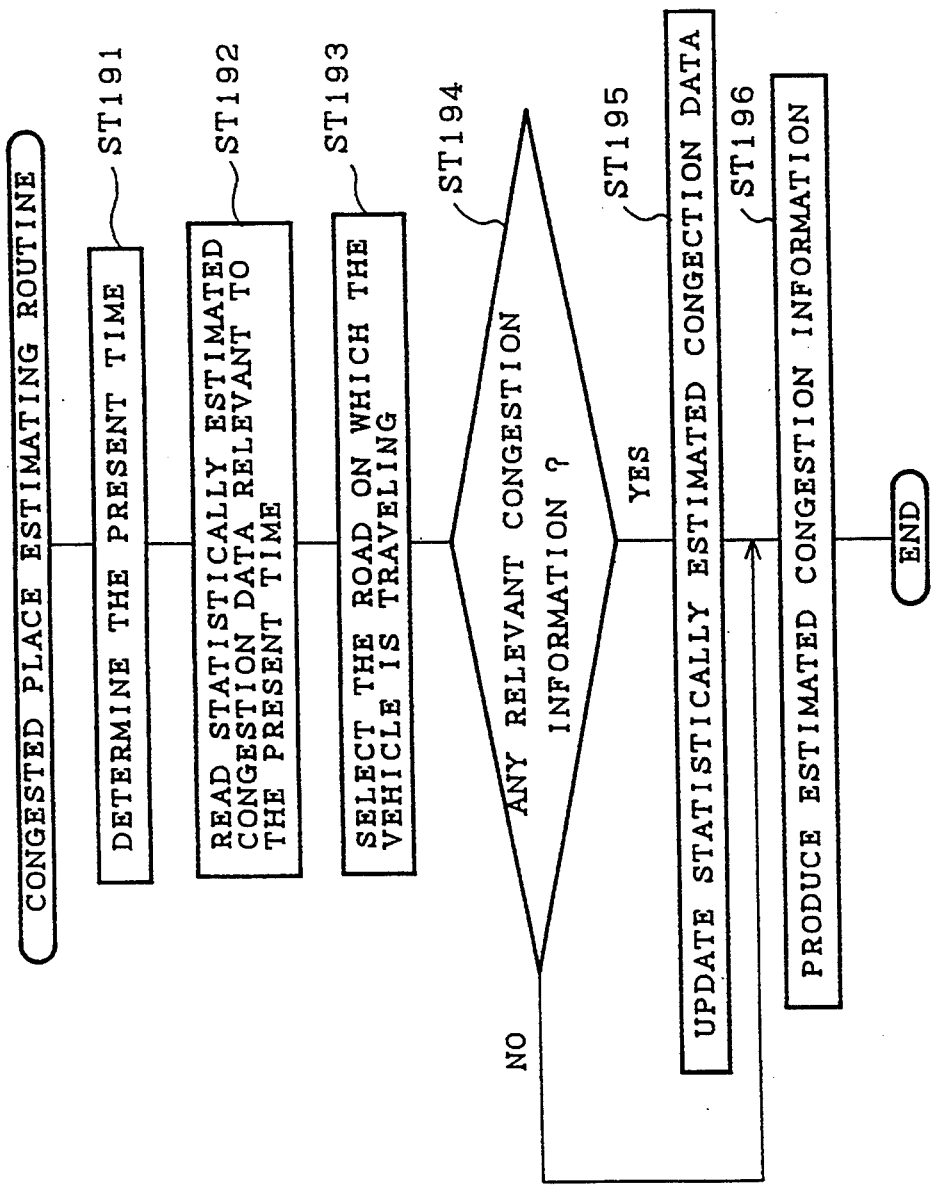
FIG. 30 is a flow chart of a congested place estimating procedure to be executed by a vehicle guidance system in a thirteenth embodiment according to the present invention.

A vehicle guidance system in a thirteenth embodiment according to the present invention will be described hereinafter. This vehicle guidance system uses congestion detecting time and statistical congestion data for congested place estimation. The functional configuration of the vehicle guidance system in the thirteenth embodiment is the same as that shown in FIG. 2 and the arrangement of the concrete components of the same is the same as that shown in FIG. 3. The general operation of the vehicle guidance system is the same as that represented by the flow chart shown in FIG. 5, except that the vehicle guidance system executes a congested place estimating procedure represented by a flow chart shown in FIG. 30 in step ST10.

Figure 31:
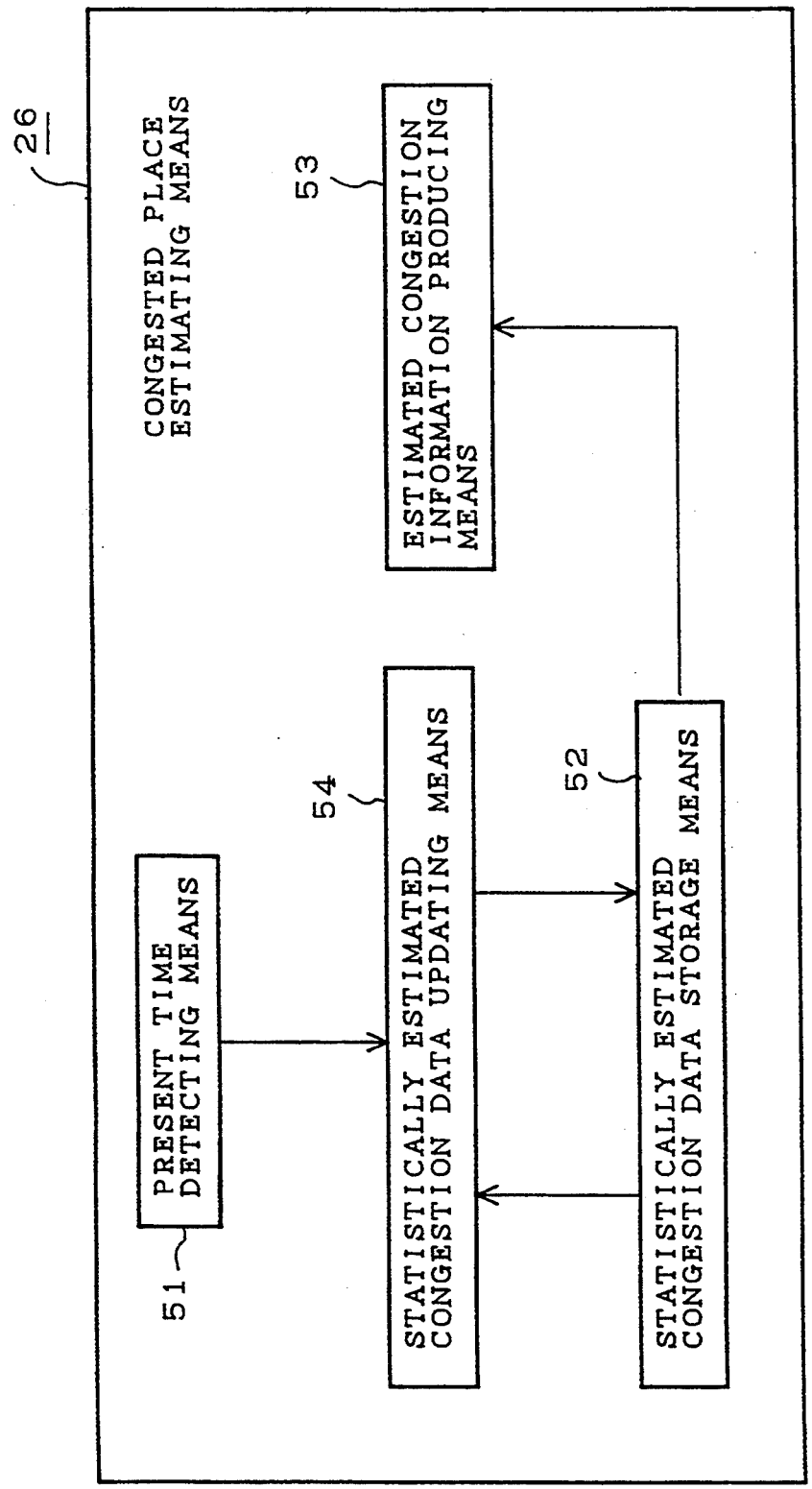
FIG. 31 is a block diagram of a congested place estimating unit included in the vehicle guidance system in the thirteenth embodiment.

Referring to FIG. 31 showing a congested place estimating means 26 employed in the thirteenth embodiment in a block diagram, a statistically estimated congestion data updating means 54 finds presumably congested roads on the basis of the present position of the vehicle detected by a present position detecting means 21 and road data read from a road data storage means 28, and updates statistical congestion data when the data of the presumably congested roads and time are not included in the statistical congestion data. In such a case, the congested place estimating means 26 estimates congested roads on the basis of the present time and the road data, and updates the statistically estimated congestion data when the congested roads and the time are not included in the statistical data to learn further information about traffic congestion.

In operation, the statistical data updating means 54 receives a signal representing the present time from a present time detecting means 51 in step ST191. Since the congested place estimating means 26 is actuated upon the detection of traffic congestion by a congestion detecting means 23, the present time corresponds to the time when the vehicle encounters traffic congestion. An estimated congestion information producing means 53 reads statistically estimated congestion data corresponding to the present time, i.e., data representing junctions which are presumably congested at the present time in a time period included in congested time information, from a statistically estimated congestion data storage means 52 in step ST192. Then, the estimated congestion information producing means 53 determines the road on which the vehicle is traveling and the direction of travel of the vehicle on the basis of the present position of the vehicle provided by the present position detecting means and the road data read from the road data storage means 28, and extracts a junction on the upside of the road in step ST192.

The statistical congestion data updating means 54 makes a query in step ST194 to see if the data obtained in step ST192 includes the function determined in step ST193. The routine goes to step ST195 if the response in step ST194 is negative or goes to step ST196 if the response in step ST194 is affirmative. If the response in step ST194 is negative, the time is added to the statistical congestion data in step ST195; that is, a value representing the time in a predetermined time unit t (for example, in a time unit of 30 min) is added to the statistical congestion data for the extracted junction.

Suppose, for example, that the present time is "8:46:30, Tuesday, Nov. 30, 1993,", statistically estimated data as shown in FIG. 27 is stored in the statistical congestion data storage means 52, the vehicle is traveling on a the road between the junctions 102 and 103 toward the junction 103, and the junction 103 is ahead of the vehicle. Then, it is estimated on the bases of the statistical congestion data that junctions 104, 109 and 114 are presumably congested at the present time, and congested time information about the junctions 104, 109 and 114 are read in step ST192. However, the congested time information about the junctions 104, 109 and 114 does not include that about the junction 103 extracted in step ST193. Then, the statistical congestion data updating means 54 adds data representing the congested time information about the junction 103 in the time unit t to the statistical congestion data to update the latter. FIG. 32 shows the thus updated statistical congestion data.

The statistical congestion data shown in FIG. 32 was obtained by updating the statistical congestion data shown in FIG. 28; that is, the congestion time information about the junction 103 shown in FIG. 28, i.e., the congested time period of "6:30 to 8:30", is changed by using the congested time information about the junction 103 at "8:46:30, Nov. 30, 1993, Tues." expressed in the time unit t (for example, 30 min). Concretely, the congested time period "6:30 to 8:30" is changed for a time period "6:30 to 9:00" by adding a time period "8:30 to 9:00" including the time "8:46:30" to the statistical congestion data shown in FIG. 28.

Then, the estimated congestion information producing means 53 produced estimated congestion information on the basis of the statistical congestion data and gives the estimated congestion information to a congestion length calculating means 29 and a road data weighting means 25 in step ST196. The estimated congestion information producing means 53 extracts the junction 103, 104, 109 and 114 presumably congested at the present time "8:46:30, Nov. 30, 1993, Tuesday." on the basis of the updated statistical congestion data shown in FIG. 32. The numbers of the junctions 103, 104, 109 and 114 are the estimated congestion information.

Although the thirteenth embodiment uses the time data for the junctions as the statistical congestion data, it is also possible to use time data for each road between the two junctions as the statistical congestion data. When the latter time data is used, statistical estimated congestion information for both the up side and the down side of each road may be stored.

Furthermore, although the thirteenth embodiment uses only the congested time information as the statistical congestion data, congested term information, such as statistical information about presumably congested months, presumably congested dates, presumably congested days of the week and presumably congested times, may be used. Still further, the degree of effect of congestion, such as the mean traveling speed of the vehicle under traffic congestion, may be used in combination with the congested time information and the vehicle guidance system may be capable of learning those data.

What is claimed is:

1. A vehicle guidance system comprising: a road data storage means storing road data serving as information about roads;
   a present position detecting means for detecting the present position of the vehicle;
   a destination specifying means for specifying the destination of the vehicle;
   a routing means for finding a recommendable route between the present position and the destination by using the road data; and
   a congested place estimating means for estimating congested roads on the recommendable route by using the road data when the vehicle is involved in traffic congestion.

2. A vehicle guidance system according to claim 1, wherein the congested place estimating means estimates congested roads on the basis of classes of roads.

3. A vehicle guidance system according to claim 1, further comprising a travel speed calculator, calculating a traveling speed of the vehicle; and wherein the congested place estimating means estimates congested roads on the basis of a variation of the traveling speed of the vehicle involved in traffic congestion, and the road data.

4. A vehicle guidance system according to claim 1, wherein the congested place estimating means uses statistically estimated congestion data representing traffic congestion, and the road data when estimating congested roads.

5. A vehicle guidance system according to claim 1, further comprising a road data weighing means for weighing the road data of the estimated congested roads by weighing factors included in the road data, and wherein the routing means also finds a new recommendable route between the present position of the vehicle and the destination on the basis of the weighted road data.

6. A vehicle guidance system according to claim 4, wherein the congested place estimating means includes statistically estimated congestion data updating means for updating the statistically estimated congestion data on the basis of information about a congested road detected by a congestion detecting means.

7. A vehicle guidance system comprising:
   a road data storage means for storing road data serving as information about roads;
   a present position detecting means for detecting the present position of the vehicle;
   a destination specifying means for specifying the destination of the vehicle;
   a routing means for finding a recommendable route between the present position and the destination by using the road data;
   a congestion detecting means for detecting traffic congestion on the basis of a traveling mode of the vehicle; and
   a congested place estimating means for estimating presumably congested roads on the recommendable route by using the road data when the congestion detecting means detects traffic congestion.

8. A vehicle guidance system according to claim 7, further comprising a travel speed calculator, calculating a traveling speed of the vehicle; and wherein the congestion detecting means detects traffic congestion on the basis of the traveling speed of the vehicle.

9. A vehicle guidance system according to claim 7, further including a braking detector, detecting braking of the vehicle; and wherein the congestion detecting means detects traffic congestion on the basis of a variation of intervals between braking cycles while the vehicle is traveling.

10. A vehicle guidance system according to claim 7, further including a braking detector, detecting braking of the vehicle; and wherein the congestion detecting means detects traffic congestion on the basis of a number of braking cycles in a predetermined time interval while the vehicle is traveling.

11. A vehicle guidance system according to claim 7, wherein the congested place estimating means estimates presumably congested roads on the basis of the classes of roads included in the road data.

12. A vehicle guidance system according to claim 7, further comprising a speed calculator, calculating a traveling speed of the vehicle; and wherein the congested place estimating means estimates presumably congested roads on the basis of a variation of the traveling speed of the vehicle involved in traffic congestion, and the road data.

13. A vehicle guidance system according to claim 7, wherein the congested place estimating means estimates presumably congested roads on the basis of statistically estimated congestion data and the road data.

14. A vehicle guidance system according to claim 7, further comprising a road data weighing means for weighing the road data of the estimated congested roads by weighing factors included in the road data, wherein the routing means finds a new recommendable route between the present position of the vehicle and the destination by using the weighted road data.

15. A vehicle guidance system according to claim 13, wherein the congested place estimating means includes statistically estimated congestion data updating means for updating the statistically estimated congestion data by using information about the congested road detected by the congestion detecting means.

* * * * *